US 6,462,136 B1

(12) United States Patent
Saito et al.

(10) Patent No.: US 6,462,136 B1
(45) Date of Patent: Oct. 8, 2002

(54) ETHYLENE COPOLYMER AND PROCESS FOR PRODUCING THE SAME, RESIN COMPOSITION CONTAINING THE COPOLYMER, AND USES OF THESE

(75) Inventors: Junji Saito; Keiji Okada; Kenichi Morizono; Makoto Mitani; Terunori Fujita, all of Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/582,274

(22) PCT Filed: Oct. 18, 1999

(86) PCT No.: PCT/JP99/05734

§ 371 (c)(1),
(2), (4) Date: Jun. 23, 2000

(87) PCT Pub. No.: WO00/24822

PCT Pub. Date: May 4, 2000

(30) Foreign Application Priority Data

Oct. 23, 1998 (JP) ............................................. 10-302993

(51) Int. Cl.$^7$ .............................. C08L 23/08; C08L 23/12
(52) U.S. Cl. ....................... 525/240; 324/319; 324/322; 526/172; 526/160
(58) Field of Search ................................. 526/172, 160; 525/240, 324, 319, 322

(56) References Cited

U.S. PATENT DOCUMENTS 5,663,236 A  9/1997  Takahashi et al.
6,174,975 B1 *  1/2001  Johnson et al.

OTHER PUBLICATIONS

JP62025105 (Abstract); Feb. 3, 1987.
JP62025106 (Abstract); Feb. 3, 1987.
JP62025107 (Abstract): Feb. 3, 1987.
JP62025108 (Abstract); Feb. 3, 1987.
JP62025109 (Abstract); Feb. 3, 1987.
EP0864589A2; Sep. 16, 1998.
EP0227206A1 (Abstract); Jul. 1, 1987.
EP0874005 (Abstract); Oct. 28,1998.
JP11315109 (Abstract); Nov. 16, 1999.
JP10316710 (Abstract); Dec. 10, 1998.
EP0924223 (Abstract); Jun. 23, 1999.
T. Repo et al., "Ethylenebis (salicylideneiminato) zirconium Dichloride: crystal structure and use as Heterogeneous catalyst in the polymerization of Ethylene"Macromolecules, vol. 30, No. 2, 1997, pp. 171–175 (Abstract).
P.G. Cozzi et al. "(Hydroxyphenyl) oxazoline: a Novel and Remarkably Facile Entry into the Area of Chiral Cationite Alkylzirconium complexes which serve as polymerization Catalyst", Organometallics, vol. 14, No. 11, 1995, pp. 4994–4996; Abst.
JP6207060A (Abstract); Jul. 26, 1994.
EP598626A2 (Abstract); May 25, 1994.

* cited by examiner

Primary Examiner—David W. Wu
Assistant Examiner—Caixia Lu
(74) Attorney, Agent, or Firm—Birch, Stewart, Kolasch & Birch, LLP

(57) ABSTRACT

The present invention is intended to provide an ethylene copolymer having excellent mechanical properties and moldability, a process for preparing the copolymer, a resin composition containing the copolymer and uses thereof. The ethylene copolymer has the following properties: the copolymer comprises 90 to 99% by mol of ethylene constituent units and 1 to 60% by mol of $C_{3\text{-}20}$ α-olefin constituent units; the ratio (Mz/Mw) of a Z average molecular weight (Mz) to a weight-average molecular weight (Mw), each molecular weight being measured by GPC, is in the range of 10 to 30, and said ratio (Mz/Mw) and the ratio (Mw/Mn) of a weight-average molecular weight (Mw) to a number-average molecular weight (Mn), each molecular weight being measured by GPC, satisfy the relation (Mz/Mw)>(Mw/Mn); the intrinsic viscosity is in the range of 0.5 to 9 dl/g; the ratio ($n^*_{0.01}/n^*_8$) of a melt viscosity ($\eta^*_{0.01}$) at a shear rate of 0.01 rad/sec, as measured at 190° C., to a melt viscosity ($\eta^*_8$) at a shear rate of 8 rad/sec, as measured at 190° C., and the intrinsic viscosity (η) satisfy the relation $(\eta^*_{0.01}/\eta^*_8) \geq 0.893 \times (\eta)+1.0$; and the absolute value of an activation energy ($E_a$) of a shift factor of melt viscoelasticity is not more than $4 \times 10^4$ J/mol.K.

10 Claims, No Drawings

ETHYLENE COPOLYMER AND PROCESS FOR PRODUCING THE SAME, RESIN COMPOSITION CONTAINING THE COPOLYMER, AND USES OF THESE

This application is the national phase under 35 U.S.C. § 371 of PCT International Application No. PCT/JP99/05734 which has an International filing date of Oct. 18, 1999, which designated the United States of America.

1. Technical Field

The present invention relates to an ethylene copolymer, uses thereof and a process for preparing an ethylene copolymer. The present invention also relates to a resin composition containing the ethylene copolymer and uses thereof.

2. Background Art

Ethylene copolymers such as ethylene/α-olefin copolymers are used for, for example, hollow containers, pipes, films, foamed articles and rubbers. The ethylene copolymers are required to be excellent in extrusion properties and bubble stability in the inflation molding and to have such an excellent moldability (flowability) that they can be expanded in a high expansion ratio in the expansion molding. Moreover, in the use of the ethylene copolymers as resin modifiers, they are required to exhibit excellent effects of improving mechanical properties such as break strength and impact resistance of molded products.

On this account, some proposals to obtain ethylene copolymers having excellent moldability and capable of providing molded products having excellent mechanical properties have been made so far.

For example, a method of blending an ethylene copolymer of high molecular weight with low-density polyethylene produced by a high-pressure polymerization process can improve moldability, but there is a problem that the resulting molded product becomes rigid or turbid to cause bad feeling.

A method of irradiating an ethylene copolymer with electron rays or adding thereto an organic peroxide to partially-crosslink the ethylene copolymer and thereby form long-chain branches can improve moldability, but there is a problem of production of a gel.

A method of widening the molecular weight of an ethylene copolymer can improve moldability such as film moldability, but the content of a low molecular weight component increases, and as a result, the mechanical properties are lowered, or the molded article has a sticky surface. For this reason, an attempt to blend an ethylene/α-olefin copolymer having a narrow molecular weight distribution and a low molecular weight with an ethylene/α-olefin copolymer having a high molecular weight has been made. However, an ethylene/α-olefin copolymer having a high molecular weight and a high content of an α-olefin, particularly an ethylene/α-olefin copolymer having excellent impact resistance, a high content of an α-olefin, a high molecular weight and rubber-like properties, has not been obtained by a process using a conventional catalyst such as a vanadium catalyst, a metallocene catalyst or a Ziegler-Natta catalyst. Accordingly, development of an ethylene/α-olefin copolymer having a wide molecular weight distribution, excellent moldability, a high content of an α-olefin and excellent impact resistance and a process for preparing the copolymer has been desired.

The present invention has been made under such circumstances as described above, and it is an object of the invention to provide an ethylene copolymer which is excellent in extrusion properties and bubble stability in the inflation molding, has such an excellent moldability that it can be expanded in a high expansion ratio in the expansion molding and is capable of producing a molded product having excellent mechanical properties such as high break strength and high impact resistance, and uses thereof. It is another object of the invention to provide a process for preparing the ethylene copolymer. It is a further object of the invention to provide a resin composition containing the ethylene copolymer and uses thereof.

DISCLOSURE OP THE INVENTION

The ethylene copolymer (a) according to the invention is obtained from ethylene and an α-olefin of 3 to 20 carbon atoms and satisfies the following requirements (i) to (v):

(i) said copolymer comprises 90 to 99% by mol of recurring units derived from ethylene (sometimes referred to as "ethylene units" hereinafter) and 1 to 60% by mol of recurring units derived from an α-olefin of 3 to 20 carbon atoms (sometimes referred to as "$C_{3-20}$ α-olefin units" hereinafter), (ii) the ratio (Mz/Mw) of a 2 average molecular weight (Mz) to a weight-average molecular weight (Mw), each molecular weight being measured by gel permeation chromatography, is in the range of 10 to 30, and said ratio (Mz/Mw) and the ratio (Mw/Mn) of a weight-average molecular weight (Mw) to a number-average molecular weight (Mn), each molecular weight being measured by gel permeation chromatography, satisfy the following relation (Mz/Mw)>(Mw/Mn), (iii) the intrinsic viscosity, as measured in decalin at 135° C., is in the range of 0.5 to 4 dl/g, (iv) the ratio ($\eta_{0.01}/\eta^*_8$) of a melt viscosity ($\eta^*_{0.01}$) at a shear rate of 0.01 rad/sec, as measured at 190° C., to a melt viscosity ($n^*_8$) at a shear rate of 8 rad/sec, as measured at 190° C., and the intrinsic viscosity ($\eta$) satisfy the following relation (1)

$$(\eta^*_{0.01}/\eta^*_8) \geq 0.843 \times (\eta) + 1.0 \quad (1),$$

and (v) the absolute value of an activation energy ($E_a$) of a shift factor of melt viscoelasticity is not more than $4 \times 10^9$ J/mol.K.

The ethylene copolymer (a) according to the invention is, for example, an ethylene copolymer comprising:

an ethylene/α-olefin copolymer (b) which comprises 40 to 99% by mol of recurring units derived from ethylene and 1 to 60% by mol of recurring units derived from an α-olefin of 3 to 20 carbon atoms and has a value of Mw/Mn, as measured by gel permeation chromatography (GPC), of 1.8 to 3.0 and an intrinsic viscosity of not less than 10 dl/q, and an ethylene/α-olefin copolymer (c) which comprises 40 to 99% by mol of recurring units derived from ethylene and 1 to 60% by mol of recurring units derived from an α-olefin of 3 to 20 carbon atoms and has a value of Mw/Mn, as measured by GPC, of 1.5 to 3.0 and an intrinsic viscosity of 0.3 to 3 dl/g;

wherein the weight ratio ((b)/(c)) of the ethylene/α-olefin copolymer (b) to the ethylene/α-olefin copolymer (c) is in the range of 0.1/99.9 to 30/70.

The ethylene/α-olefin copolymer (b) is obtained by, for example, copolymerizing ethylene and an α-olefin of 3 to 20 carbon atoms in the presence of a transition metal imine catalyst comprising:

(A) a transition metal imine compound represented by the following formula (I), and (B) at least one compound selected from the group consisting of:
(B-1) an organometallic compound,
(B-2) an organoaluminum oxy-compound, and
(B-3) a compound which reacts with the transition metal imine compound (A) to form an ion pair;

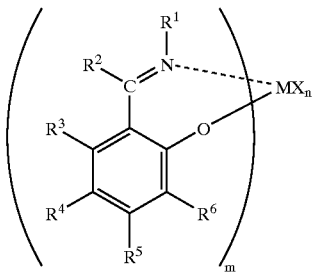

(I)

wherein M is a transition metal atom of Group 3 to Group 11 of the periodic table, m is an integer of 1 to 6, $R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, one group of $R^1$ to $R^6$ contained in one ligand and one group of $R_1$ to $R_6$ contained in another ligand may be bonded to each other, and $R^1$s, $R^2$s, $R^3$s, $R^4$s, $R^5$s or $R^6$s among the ligands may be the same or different, n is a number satisfying a valence of M, X is a hydrogen atom, a halogen atom, a hydrocarbon group, an oxygen-containing group, a sulfur-containing group, a nitrogen-containing group, a boron-containing group, an aluminum-containing group, a phosphorus-containing group; a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

The ethylene copolymer (a) can be used for, for example, a resin modifier, a foamed article and a film molded product.

The ethylene copolymer (a) can be prepared by, for example, copolymerizing ethylene and an α-olefin of 3 to 20 carbon atoms in the presence of the above-mentioned transition metal imine catalyst (1) and the following vanadium catalyst (2) or metallocene catalyst (3) hitherto known:

(1) a transition metal imine catalyst comprising:
(A) a transition metal imine compound represented by the above formula (I), and
(B) at least one compound selected from the group consisting of:
(B-1) an organometallic compound,
(B-2) an organoaluminum oxy-compound, and
(B-3) a compound which reacts with the transition metal imine compound (A) to form an ion pair
(2) a vandium catalyst comprising:
(C) a vanadium compound represented by the following formula (II):

$$VO(OR)_nX_{3-n}$$ (II)

wherein R is an aliphatic hydrocarbon residual group, X is a halogen, and $0 \leq n \leq 3$, and
(D) an organoaluminum compound;
(3) a metallocene catalyst comprising:
(E) a metallocene compound of a metal of Group 4 of the periodic table, which contains a ligand having cyclopentadienyl skeleton, and
(B) at least one compound selected from the group consisting of:
(B-1) an organometallic compound,
(B-2) an organoaluminum oxy-compound, and
(B-3) a compound which reacts with the metallocene compound (E) to form an ion pair.

The propylene polymer composition according to the invention comprises the above-mentioned ethylene copolymer (a) and polypropylene (d), and the weight ratio ((d)/(a)) of the polypropylene (d) to the ethylene copolymer (a) is in the range of 60/40 to 99/1.

The propylene polymer composition according to the invention can be used for, for example, a foamed article and a film molded product.

BEST MODE FOR CARRYING OUT THE INVENTION

The ethylene copolymer (a) according to the invention is a copolymer obtained from ethylene and an α-olefin of 3 to 20 carbon atoms.

Examples of the α-olefins of 3 to 20 carbon atoms include propylene, 1-butene, 1-pentene, 3-methyl-1-butene, 1-hexene, 4-methyl-1-pentene, 4-methyl-1-pentene, 3-methyl-1-pentene, 1-octene, 1-decene, 1-dodecene, 1-tetradecene, 1-hexadecene, 1-octadecene and 1-eicosene. Of these, preferable are α-olefins of 4 to 10 carbon atoms, particularly 9 to 8 carbon atoms. When the α-olefin is an α-olefin of 9 to 10 carbon atoms, the ethylene copolymer (a) is excellent especially in impact resistance.

When the α-olefin of 3 to 20 carbon atoms is an α-olefin of 4 to 10 carbon atoms, particularly 4 to 8 carbon atoms, the ethylene copolymer (a) used as a modifier of a synthetic resin such as polypropylene is excellent in the effect of improving impact resistance at low temperatures, especially in the effect of improving low-temperature properties (BTc).

The ethylene copolymer (a) of the invention has an ethylene unit content of usually 40 to 99% by mol, preferably 60 to 95% by mol, more preferably 70 to 93% by mol, particularly preferably 75 to 90 by mol, and has a $C_{3-20}$ α-olefin unit content of usually 1 to 60% by mol, preferably 5 to 40% by mol, more preferably 7 to 30% by mol, particularly preferably 10 to 25% by mol. More specifically, when the $C_{3-20}$ α-olefin units are recurring units derived from propylene (referred to as "propylene units" hereinafter), the propylene unit content is in the range of preferably 15 to 30% by mol, particularly preferably 20 to 25% by mol, and when $C_{3-20}$ α-olefin units are recurring units derived from an α-olefin 4 to 20 carbon atoms (referred to as "$C_{4-20}$ α-olefin units" hereinafter), the $C_{4-20}$ α-olefin unit content is in the range of preferably 5 to 25% by mol, particularly preferably 10 to 20% by mol.

The ethylene unit content and the $C_{3-20}$ α-olefin unit content in the ethylene copolymer (a) can be determined by $^{13}$C-NMR. In the measurement of $^{13}$C-NMR, the ethylene copolymer (a) is completely dissolved in orthodichlorobenzene containing a small amount of deuterized benzene as a lock solvent and the $^{13}$C-NMR is measured at 120° C. by a proton complete decoupling method.

With respect to the chemical shift, the carbon peak of the deuterized benzene is set to 128.0 ppm using tetramethylsilane as a reference, and the chemical shift of other carbon peak is determined by using this value as a reference.

The ratio (Mz/Mw) of a Z average molecular weight (Mz) of the ethylene copolymer (a) to a weight-average molecular weight (Mw) thereof, each molecular weight being measured by GPC; is in the range of 10 to 30, preferably 12 to 30, more preferably 15 to 30, and said ratio (Mz/Mw) and the ratio (Mw/Mn) of a weight-average molecular weight (Mw) thereof to a number-average molecular weight (Mn) thereof, each molecular weight being measured by GPC, satisfy the following relation $$(Mz/Mw) > (Mw/Mn).$$

The molecular weight distribution (Mw/Mn) of the ethylene copolymer (a) is in the range of usually 2 to 5, preferably 2.5 to 9.5.

The fact that the value of (Mz/Mw) and the value of (Mw/Mn) satisfy the above relation indicates that the ethylene copolymer (a) has a molecular weight distribution having its tail on the high molecular weight side, namely, a high tail type molecular weight distribution. The ethylene copolymer (a) having the high tail type molecular weight distribution is excellent in processability such as film moldability and expansion properties as well as in break strength and elongation at break.

When ethylene and the α-olefin of 3 to 20 carbon atoms are copolymerized by a conventional process using a conventional catalyst, such as a vanadium catalyst, a metallocene catalyst or a Ziegler-Natta catalyst, polymers satisfying the relation of (Mz/Mw)>(Mw/Mn) cannot be obtained.

If such an ethylene copolymer (a) is used as a modifier of resins such as other polyolefins, particularly polypropylene, a resin composition having good balance between rigidity and impact strength can be obtained.

The intrinsic viscosity (η) of the ethylene copolymer (a) of the invention, as measured in decalin at 135° C., is in the range of 0.5 to 4 dl/g, preferably 1 to 3.5 dl/g, more preferably 1.5 to 3 dl/g. When the intrinsic viscosity (η) is in this range, the copolymer tends to be excellent in mechanical properties such as break strength and in moldability such as extrusion properties.

The ratio $(n^*_{0.01}/n^*_8)$ of a melt viscosity $(n^*_{0.01})$ of the ethylene copolymer (a) at a shear rate of 0.01 rad/sec, as measured at 190° C., to a melt viscosity $(n^*_8)$ thereof at a shear rate of 8 rad/sec, as measured at 190° C., and the intrinsic viscosity (η) satisfy the following relation (1)

$$(\eta^*_{0.01}/\eta^*_8) \geq 0.843 \times (\eta) + 1.0 \quad (1)$$

and preferably satisfy the following relation (2)

$$(\eta^*_{0.01}/\eta^*_8) \leq 0.843 \times (\eta) + 2.0 \quad (2).$$

$(\eta^*_{0.01}/\eta\eta^*_8)$ is a measure of viscosity in the low-shear rate region. The ethylene copolymer (a) satisfying the above relation exhibits excellent bubble stability in the inflation film molding, and a high expansion ratio can be achieved in the expansion molding. The fact that the ethylene copolymer (a) satisfies the above relation (1) indicates that an ingredient having a long relaxation time is contained in the copolymer. Therefore, the ethylene copolymer (a) has excellent impact absorption ability and is useful as a modifier of synthetic resin. Especially when the ethylene copolymer (a) is added as a rubber modifier, it exhibits excellent effect of improving impact resistance.

In the ethylene copolymer (a), the absolute value of an activation energy (Ea) of a shift factor of melt viscoelasticity is not more than $4 \times 10^4$ J/mol.K, preferably not more than $3.7 \times 10^4$ J/mol.K, more preferably not more than $3.5 \times 10^4$ J/mol.K. The absolute value of an activation energy (Ea) of a shift factor of melt viscoelasticity is a measure of quantity of long-chain branches (LCB). The smaller the absolute value is, the smaller the quantity of the long-chain branches is. The ethylene copolymer (a) of the invention substantially has no long-chain branch.

Because of small quantity of long-chain branches, the ethylene copolymer (a) of the invention is excellent in properties such as break strength.

Although the melting point (Tm) of the ethylene copolymer (a) measured by a differential scanning calorimeter is not specifically limited, it is preferably not higher than 100° C.

The melting point is measured in accordance with ASTM D 3418.

The ethylene copolymer (a) of the invention has excellent extrusion properties, exhibits excellent bubble stability when subjected to inflation molding and has such excellent moldability that it can be expanded in a high expansion ratio in the expansion molding. Further, by the use of the ethylene copolymer (a), a molded product having excellent mechanical properties such as high break strength and high impact resistance can be obtained. Moreover, when the ethylene copolymer (a) is blended as a resin modifier with a synthetic resin such as polypropylene, the impact resistance can be enhanced, and besides a resin composition well-balanced between rigidity and impact resistance can be obtained.

The ethylene copolymer (a) according to the invention is superior to conventional ethylene copolymers in the effect of modifying polypropylene, and this can be confirmed in the following manner.

A polypropylene composition comprising an ethylene copolymer and polypropylene is prepared using a conventional ethylene copolymer. The polypropylene composition is measured on the Izod impact strength (measurement at −30° C.). Then, using other conventional ethylene copolymers having various melt flow rates (MFR), polypropylene compositions are prepared in the same manner as above, and the polypropylene compositions are measured on the Izod impact strength similarly to the above. The MFR of the conventional ethylene copolymers and the Izod impact strengths of the polypropylene compositions using the copolymers are checked to find their relation.

Separately, using the ethylene copolymer (a) of the invention, a polypropylene composition is prepared, and the composition is measured on the Izod impact strength similarly to the above. The Izod impact strengths having the same MFR are compared with each other, and thereby the modifying effect of the ethylene copolymer (a) is compared with that of the conventional ethylene copolymer. The impact strengths may be compared by checking the low-temperature brittle temperatures (BTc) thereof.

Further, by checking a relation between rigidity R and impact strength of polypropylene modified with the conventional ethylene copolymer and that of polypropylene modified with the ethylene copolymer (a) of the invention having almost the same MFR, balances between the impact strength and the rigidity in both cases can be compared.

In the above examination, the Izod impact strength is measured in accordance with ASTM D256, the rigidity R is measured in accordance with ASTM D785, MFR is measured in accordance with ASTM D1238, and BTc is measured in accordance with ASTM D796.

The ethylene copolymer (a) according to the invention comprises, for example, the following ethylene/α-olefin copolymer (b) and the following ethylene/α-olefin copolymer (c).

The ethylene/α-olefin copolymer (b) is a copolymer obtained .from ethylene and an α-olefin of 3 to 20 carbon atoms.

Examples of the α-olefins of 3 to 20 carbon atoms include the same α-olefins as previously described. Of these, preferable are α-olefins of 9 to 10 carbon atoms, particularly 9 to 8 carbon atoms.

The ethylene/α-olefin copolymer (b) has an ethylene unit content of usually 40 to 99 (η) by mol, preferably 60 to 95% by mol, more preferably 70 to 93 (η) by mol, particularly preferably 75 to 90% by mol, and has a $C_{3-20}$ α-olefin unit content of usually 1 to 60 (η) by mol, preferably 5 to 40 (η) by mol, more preferably 7 to 30% by mol, particularly preferably 10 to 25 (η) by mol. More specifically, when the $C_{3-20}$ α-olefin units are propylene units, the propylene unit content is in the range of preferably 15 to 30% by mol, particularly preferably 20 to 25 (η) by mol, and when $C_{3-20}$ α-olefin units are $C_{4-20}$ α-olefin units, the $C_{4-20}$ α-olefin unit content is in the range of preferably 5 to 25% by mol, particularly preferably 10 to 20% by mol.

The ethylene/α-olefin copolymer (b) has (Mw/Mn), as measured by GPC, of 1.8 to 3.0, preferably 1.8 to 2.8, more preferably 1.8 to 2.7, and an intrinsic viscosity (η) of not less than 10 dl/g, preferably 10 to 30 dl/g, particularly preferably 12 to 25 dl/g.

The ethylene/α-olefin copolymer (c) is a copolymer obtained from ethylene and an α-olefin of 3 to 20 carbon atoms.

Examples of the α-olefins of 3 to 20 carbon atoms include the same α-olefins as previously described. Of these, preferable are α-olefins of 9 to 10 carbon atoms, particularly 4 to 8 carbon atoms.

The ethylene/α-olefin copolymer (c) has an ethylene unit content of usually 40 to 99 (η) by mol, preferably 60 to 95% by mol, more preferably 70 to 93% by mol, particularly preferably 75 to 90 (η) by mol, and has a $C_{3-20}$ α-olefin unit content of usually 1 to 60% by mol, preferably 5 to 40% by mol, more preferably 7 to 30% by mol, particularly preferably 10 to 25% by mol. More specifically, when the $C_{3-20}$ α-olefin units are propylene units, the propylene unit content is in the range of preferably 15 to 30% by mol, particularly preferably 20 to 25% by mol, and when $C_{3-20}$ α-olefin units are $C_{4-20}$ α-olefin units, the $C_{4-20}$ α-olefin unit content is in the range of preferably 5 to 25% by mol, particularly preferably 10 to 20% by mol.

The ethylene/α-olefin copolymer (c) has (Mw/Mn), as measured by GPC, of 1.5 to 3.0, preferably 1.5 to 2.8, more preferably 1.5 to 2.7, and an intrinsic viscosity (η) of 0.3 to 3 dl/g, preferably 0.5 to 2.7 dl/g, particularly preferably 0.5 to 2.5 dl/g.

The weight ratio ((b)/(c)) of the ethylene/α-olefin copolymer (b) to the ethylene/α-olefin copolymer (c) is in the range of 0.1/99.9 to 30/70, preferably 0.5/99.5 to 20/80, more preferably 1/99 to 15/85.

When the weight ratio of the ethylene/α-olefin copolymer (b) to the ethylene/α-olefin copolymer (c) is in the above range, the ethylene copolymer (a) is excellent in mechanical properties such as break strength and in moldability such as extrusion properties.

The $C_{3-20}$ α-olefin unit content in the ethylene/α-olefin copolymer (b) is preferably equal to or higher than the $C_{3-20}$ α-olefin unit content in the ethylene/α-olefin copolymer (c). When the $C_{3-20}$ α-olefin unit content in the ethylene/α-olefin copolymer (b) is equal to or higher than the $C_{3-20}$ α-olefin unit content in the ethylene/α-olefin copolymer (c), the ethylene copolymer (a) has excellent impact resistance, and therefore, when the ethylene copolymer (a) is used as a modifier of a synthetic resin, it exhibits excellent effect of improving impact resistance.

The ethylene copolymer (a)comprising the ethylene/α-olefin copolymer (b) and the ethylene/α-olefin copolymer (c) is prepared by, for example, in-line blending in the preparation process or post blending.

Blending of the ethylene/α-olefin copolymer (b) and the ethylene/α-olefin copolymer (c) can be carried out by, for example, the following methods.

(1) The ethylene/α-olefin copolymer (b), the ethylene/α-olefin copolymer (c) and additives optionally used are mechanically blended using an extruder, a kneader or the like.

(2) The ethylene/α-olefin copolymer (b), the ethylene/α-olefin copolymer (c) and additives optionally used are dissolved in an appropriate good solvent (e.g., hydrocarbon solvent such as hexane, heptane, decane, cyclohexane, benzene, toluene or xylene), and then the solvent is removed from the solution.

(3) The ethylene/α-olefin copolymer (b), the ethylene/α-olefin copolymer (c) and additives optionally used are each independently dissolved in an appropriate good solvent, then the resulting solutions are mixed, and the solvents are removed from the mixture.

(4) The above methods (1) to (3) are carried out in combination.

The ethylene/α-olefin copolymer (b) can be obtained by copolymerizing ethylene and an α-olefin of 3 to 20 carbon atoms in the presence of, for example, an olefin polymerization catalyst comprising:

(A) a transition metal imine compound represented by the below-described formula (I), and (B) at least one compound selected from the group consisting of:
(B-1) an organometallic compound,
(B-2) an organoaluminum oxy-compound, and
(B-3) a compound which reacts with the transition metal imine compound (A) to form an ion pair.

The ethylene/α-olefin copolymer (c) can be obtained by copolymerizing ethylene and an α-olefin of 3 to 20 carbon atoms in the presence of, for example,
a vanadium catalyst comprising
(C) a vanadium compound represented by the following formula (II):

$$VO(OR)_nX_{3-n} \qquad (II)$$

wherein R is an aliphatic hydrocarbon residual group, X is a halogen, and $0 \leq n \leq 3$), and (D) an organoaluminum compound; or a metallocene catalyst comprising (E) a metallocene compound of a metal of Group 4 of the periodic table, which contains a ligand having cyclopentadienyl skeleton, and (B) at least one compound selected from the group consisting of:
(B-1) an organometallic compound,
(B-2) an organoaluminum oxy-compound, and
(B-3) a compound which reacts with the metallocene compound (E) to form an ion pair.

The ethylene/α-olefin copolymer (c) can also be obtained by the use of a conventional Ziegler-Natta catalyst.

The catalyst components for forming the transition metal imine catalyst used for preparing the ethylene/α-olefin copolymer (b) and the components for forming the vanadium catalyst and the metallocene catalyst used for preparing the ethylene/α-olefin copolymer (c) are described below in more detail.

(A) Transition Metal Imine Compound

The transition metal imine compound used in the preparation of the ethylene/α-olefin copolymer (b) is represented by the following formula (I).

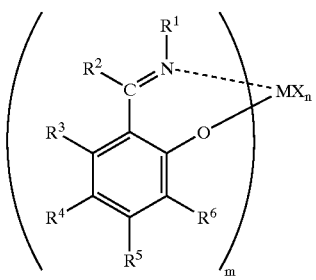

wherein N—M generally indicates coordination, but in the invention, it may indicate coordination or no coordination.

In the formula (I), M is a transition metal atom of Group 3 (including lanthanoid) to Group 11 of the periodic table, preferably a transition metal atom of Group 3 (including lanthanoid) to Group 9 of the periodic table, more preferably a transition metal atom of Group 3 to Group 5 and Group 9 of the periodic table, particularly preferably a transition metal atom of Group 4 or Group 5. Examples of such metal atoms include scandium, titanium, zirconium, hafnium, vanadium, niobium, tantalum, cobalt, rhodium, yttrium, chromium, molybdenum, tungsten, manganese, rhenium, iron and ruthenium. Of these, preferable are scandium, titanium, zirconium, hafnium, vanadium, niobium, tantalum, cobalt and rhodium. More preferable are titanium, zirconium, hafnium, cobalt, rhodium, vanadium, niobium and tantalum. Particularly preferable are titanium, zirconium and hafnium.

m is an integer of 1 to 6, preferably an integer of 1 to 4.

$R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

The halogen atom is fluorine, chlorine, bromine or iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, isopropylphenyl, tert-butylphenyl, dimethylphenyl and di-tert-butylphenyl.

In the above hydrocarbon groups, a halogen may be substituted for the hydrogen atom. Examples of such hydrocarbon groups include halogenated hydrocarbon groups of 1 to 30 carbon atoms, preferably 1 to 20 carbon atoms, such as trifuluromethyl, pentafluorophenyl and chlorophenyl.

Further, the above hydrocarbon groups may be substituted with other hydrocarbons groups. Examples of such hydrocarbon groups include aryl group-substituted alkyl groups, such as benzyl and cumyl.

Furthermore, the above hydrocarbon groups may have heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanic ester group, an amidino group, a diazo group and an ammonium salt group derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanic ester group, an isothiocyanic ester group, a sulfonic ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group and a phosphato group; silicon-containing groups; germanium-containing groups; or tin-containing groups.

Of the above hydrocarbon groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; aryl groups of 6 to 30 carbon atoms, preferably 6 to 20 carbon atoms, such as phenyl, naphthyl, biphenylyl, terphenylyl, phenathryl and anthryl; and substituted aryl groups wherein the above aryl groups are substituted with 1 to 5 substituent groups such as halogen atoms, alkyl groups of 1 to 30 carbon atoms, preferably 1 to 20 carbon atoms, alkoxy groups of 1 to 30 carbon atoms, preferably 1 to 20 carbon atoms, aryl groups of 6 to 30 carbon atoms, preferably 6 to 20 carbon atoms, and aryloxy groups of 6 to 30 carbon atom, preferably 6 to 20 carbon atoms.

Examples of the heterocyclic compound residual groups include residual groups of nitrogen-containing compounds (e.g., pyrrole, pyridine, pyrimidine, quinoline and triazine), residual groups of oxygen-containing compounds (e.g., furan and pyran), residual groups of sulfur-containing compounds (e.g., thiophene), and groups wherein these heterocyclic compound residual groups are further substituted with substituent groups such as alkyl groups of 1 to 30 carbon atoms, preferably 1 to 20 carbon atoms, and alkoxy groups of 1 to 30 carbon atoms, preferably 1 to 20 carbon atoms.

Examples of the oxygen-containing groups, the nitrogen-containing groups, the boron-containing groups, the sulfur-containing groups and the phosphorus-containing groups indicated by $R^1$ to $R^6$ are identical with the above-exemplified groups which may be contained in the hydrocarbon groups.

The silicon-containing groups is a silyl group, a siloxy group, a hydrocarbon-substituted silyl group, a hydrocarbon-substituted siloxy group or the like. Examples of the hydrocarbon-substituted silyl groups include methylsilyl, dimethylsilyl, trimetylsilyl, ethylsilyl, diethylsilyl, triethylsilyl, diphenylmethylsilyl, triphenylsilyl, dimethylphenylsilyl, dimethyl-tert-butylsilyl and dimethyl (pentafluorophenyl) silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. An example of the hydrocarbon-substituted siloxy group is trimethylsiloxy.

Examples of the germanium-containing groups or the tin-containing groups include groups wherein silicon is replaced with germanium or tin in the above-mentioned silicon-containing groups.

The above examples of the groups indicated by $R^1$ to $R^6$ are more specifically described below.

Of the oxygen-containing groups, preferred examples of the alkoxy groups include methoxy, ethoxy, n-propoxy, isopropoxy, n-butoxy, isobutoxy and tert-butoxy; preferred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred examples of the amido groups include acetamido, N-methylacetamido and N-methylbenzamido; preferred examples of the amino groups include dimethylamino, ethylmethylamino and diphenylamino; preferred examples of the imido groups include acetimido and benzimido; and preferred examples of the imino groups include methylimino, ethylimino, propylimino, butylimino and phenylimino.

Of the sulfur-containing groups, preferred examples of the alkylthio groups include methylthio and ethylthio; preferred examples of the arylthio groups include phenylthio, ethylphenylthio and naphthylthio; preferred examples of the thioester groups include acetylthio, benzoylthio, methylthiocarbonyl and phenylthiocarbonyl; preferred examples of sulfonic ester groups include methylsulfonato, ethylsulfonato and phenylsulfonato; and preferred examples of the sulfonamido groups include phenylsulfonamido, N-methylsulfonamido and N-methyl-p-toleuenesulfonamido.

$R^6$ is preferably a substituent group other than hydrogen. That is, $R^6$ is preferably a halogen atom, a hydrocarbon group, a heterocyclic compound residual group, an oxygen-containing group, a boron-containing group, a sulfur-containing group, a silicon-containing group, a germanium-containing group or a tin-containing group. $R^6$ is more preferably a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an amino group, an imido group, an imino group, a sulfonic ester group, a sulfonamido group, a cyano group, a nitro group or a hydroxyl group, and is particularly preferably a halogen atom, a hydrocarbon group or a hydrocarbon-substituted silyl group.

Preferred examples of the hydrocarbon groups indicated by $R^6$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, benzyl, naphthyl, biphenylyl and triphenylyl; and groups wherein these groups are further substituted with substituent groups such as alkyl groups of 1 to 30 carbon atoms, preferably 1 to 20 carbon atoms, alkoxy groups of 1 to 30 carbon atoms, preferably 1 to 20 carbon atoms, halogenated alkyl groups of 1 to 30 carbon atoms, preferably 1 to 20 carbon atoms, aryl groups of 6 to 30 carbon atoms, preferably 6 to 20 carbon atoms, aryloxy groups of 1 to 30 carbon atom, preferably 1 to 20 carbon atoms, halogen atoms, a cyano group, a nitro group, and a hydroxyl group.

Preferred examples of the hydrocarbon-substituted silyl groups indicated by $R^6$ include methylsilyl, dimethylsilyl, trimethysilyl, ethylsilyl, diethylsilyl, triethylsilyl, diphenylmethylsilyl, triphenylsilyl, dimethylphenylsilyl, dimethyl-tert-butylsilyl and dimethyl (pentafluorophenyl) silyl. Of these, particularly preferable are trimethylsilyl, triethylsilyl, diphenylmethylsilyl, triphenylsilyl, dimethylphenylsilyl, dimethyl-tert-butylsilyl and dimethyl (pentafluorophenyl) silyl.

In the present invention, $R^6$ is particularly preferably a group selected from branched alkyl groups of 3 to 30 carbon atoms, preferably 3 to 20 carbon atoms, such as isopropyl, isobutyl, sec-butyl, tert-butyl and neopentyl; groups wherein aryl groups of 6 to 30 carbon atoms, preferably 6 to 20 carbon atoms, are substituted for the hydrogen atoms in these branched alkyl groups, such as cumyl; and cyclic saturated hydrocarbon groups of 3 to 30 carbon atoms, preferably 3 to 20 carbon atoms, such as adamantyl, cyclopropyl, cyclobutyl, cyclopentyl and cyclohexyl. $R^6$ is also particularly preferably a group selected from aryl groups of 6 to 30 carbon atoms, preferably 6 to 20 carbon atoms, such as phenyl, naphthyl, fluorenyl, anthryl and phenanthryl; and hydrocarbon-substituted silyl groups.

Two or more groups of $R^1$ to $R^6$, preferably neighboring groups, may be bonded to each other to form an aliphatic ring, an aromatic ring or a hydrocarbon ring containing a hetero atom such as a nitrogen atom. These rings may further have a substituent group.

When m is 2 or greater, one group of $R^1$ to $R^6$ contained in one ligand and one group of $R^1$ to $R^6$ contained in another ligand may be bonded. When m is 2 or greater, $R^1$s, $R^2$s, $R^3$s, $R^4$s, $R^5$s, or $R^6$s among ligands may be the same or different.

n is a number satisfying a valence of M, specifically an integer of 0 to 5, preferably an integer of 1 to 4, more preferably an integer of 1 to 3.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. When n is 2 or greater, plural groups indicated by X may be the same or different.

The halogen atom is fluorine, chlorine, bromine or iodine.

Examples of the hydrocarbon groups include the same groups as previously described with respect to $R^1$ to $R^6$. Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. These hydrocarbon groups include halogenated hydrocarbon groups, specifically, groups wherein at least one hydrogen is replaced with a halogen in the hydrocarbon groups of 1 to 20 carbon atoms.

Of these, preferable are groups of 1 to 20 carbon atoms.

Examples of the heterocyclic compound residual groups include the same groups as previously described with respect of $R^1$ to $R^6$.

Examples of the oxygen-containing groups include the same groups as previously described with respect to $R^1$ to $R^6$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group.

Examples of the sulfur-containing groups include the same groups as previously described with respect of $R^1$ to $R^6$. Specifically, there can be mentioned sulfonato groups, such as methylsulfonato, trifluoromethanesulfonato, phenylsulfonato, benzylfulfonato, p-toluenesulfonato, trimethylbenzenesulfonato, triisobutylbenzenesulfonato, p-chlorobenzenesulfonato and pentafluorobenezene-sulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

Examples of the nitrogen-containing groups include the same groups as previously described with respect to $R^1$ to $R^6$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino Examples of the boron-containing groups include $BR_4$ (R is hydrogen, an alkyl group, an aryl group which may have a substituent group, a halogen atom or the like).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphinic acid group.

Examples of the silicon-containing groups include the same groups as previously described with respect to $R^1$ to $R^6$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously described with respect to $R^1$ to $R^6$. Specifically, there can be mentioned groups wherein silicon is replaced with germanium in the aforesaid silicon-containing groups.

Examples of the tin-containing groups include the same groups as previously described with respect to $R^1$ to $R^6$. Specifically, there can be mentioned groups wherein silicon is replaced with tin in the aforesaid silicon-containing groups.

Examples of the halogen-containing groups include fluorine-containing groups, such as $PF_6$ and $BR_4$; chlorine-containing groups, such as $ClO_4$ and $SbCl_6$; and iodine-containing groups, such as $IO_4$.

Examples of the aluminum-containing groups include $AlR_4$ (R is hydrogen, an alkyl group, an aryl group which may have a substituent group, a halogen atom or the like).

When n is 2 or greater, plural groups indicated by X may be the same or different, and plural groups indicated by X may be bonded to each other to form a ring.

Examples of the transition metal compounds represented by the formula (I) are given below, but the compounds of the formula (I) are not limited to those examples.

In the following examples, M is a transition metal atom, specifically, Sc(III), Ti(III), Ti(IV), Zr(III), Zr(IV), Hf(IV), V(IV), Nb(V), Ta(V), Co(II), Co(III), Rh(II), Rh(III) or Rh(IV), without limiting thereto. Of these, Ti(IV), Zr(IV) or Hf(IV) is preferable, and Ti(IV) is particularly preferable.

X is, for example, a halogen such as Cl or Br, or an alkyl group such as methyl. When plural X are present, they may be the same or different.

n is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

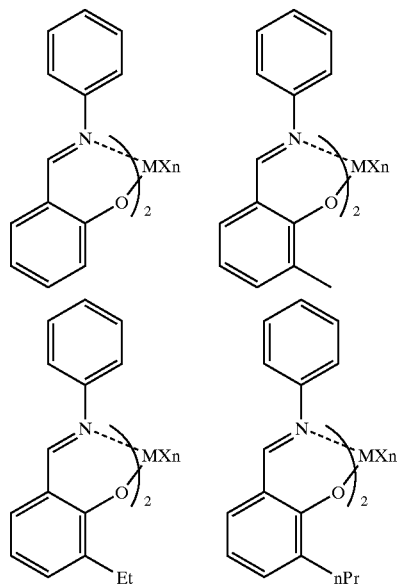

-continued
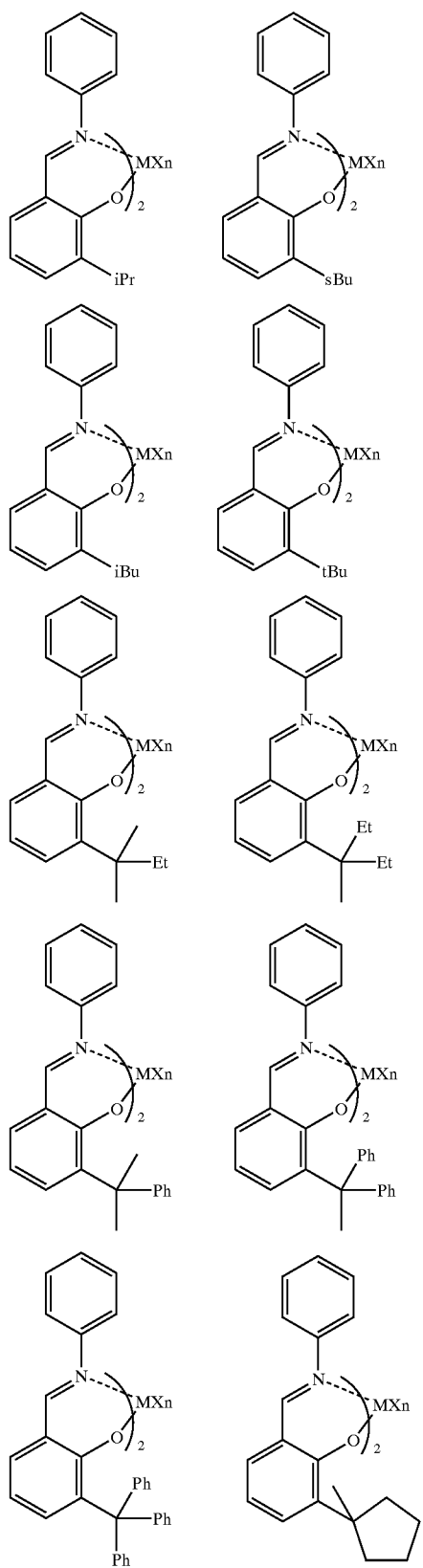
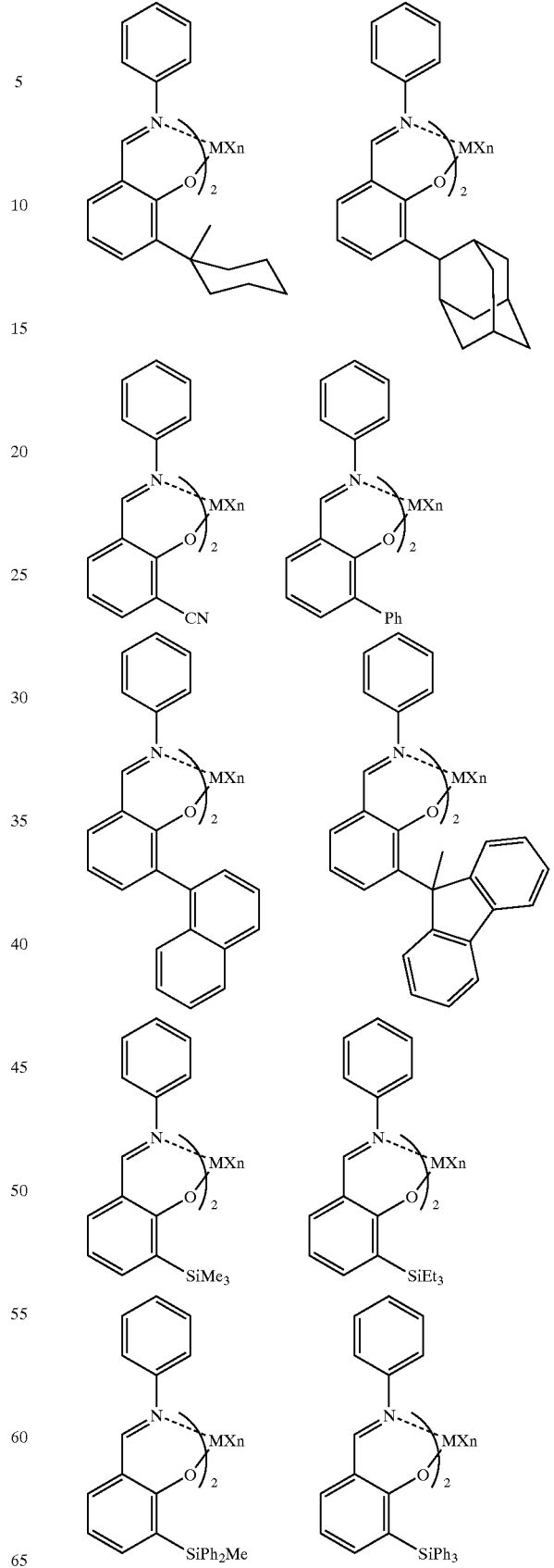

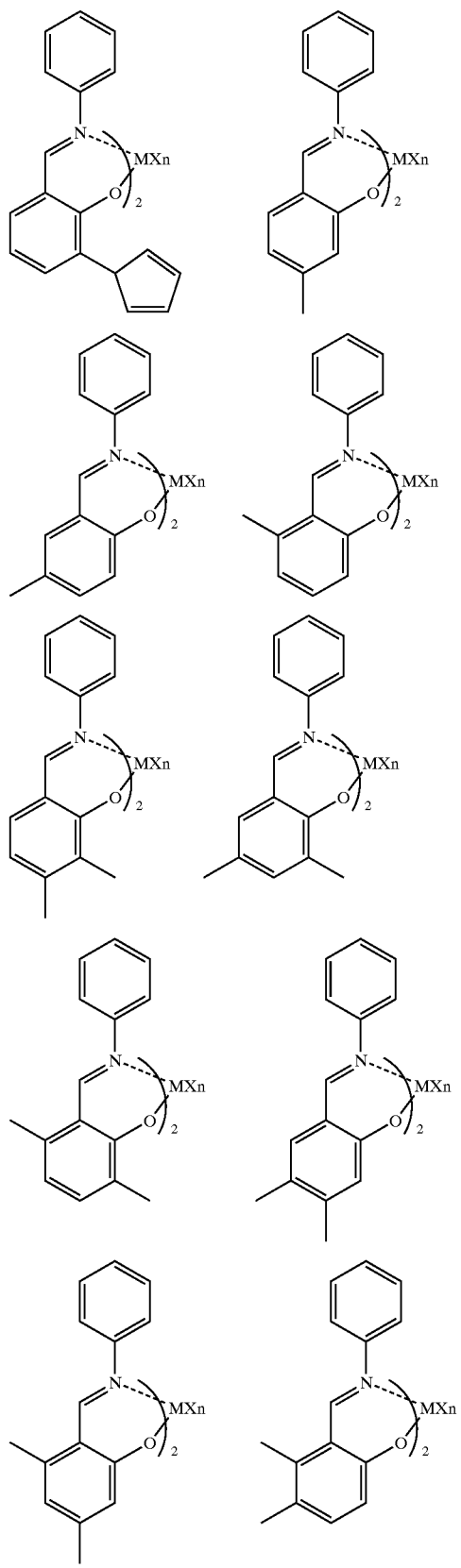
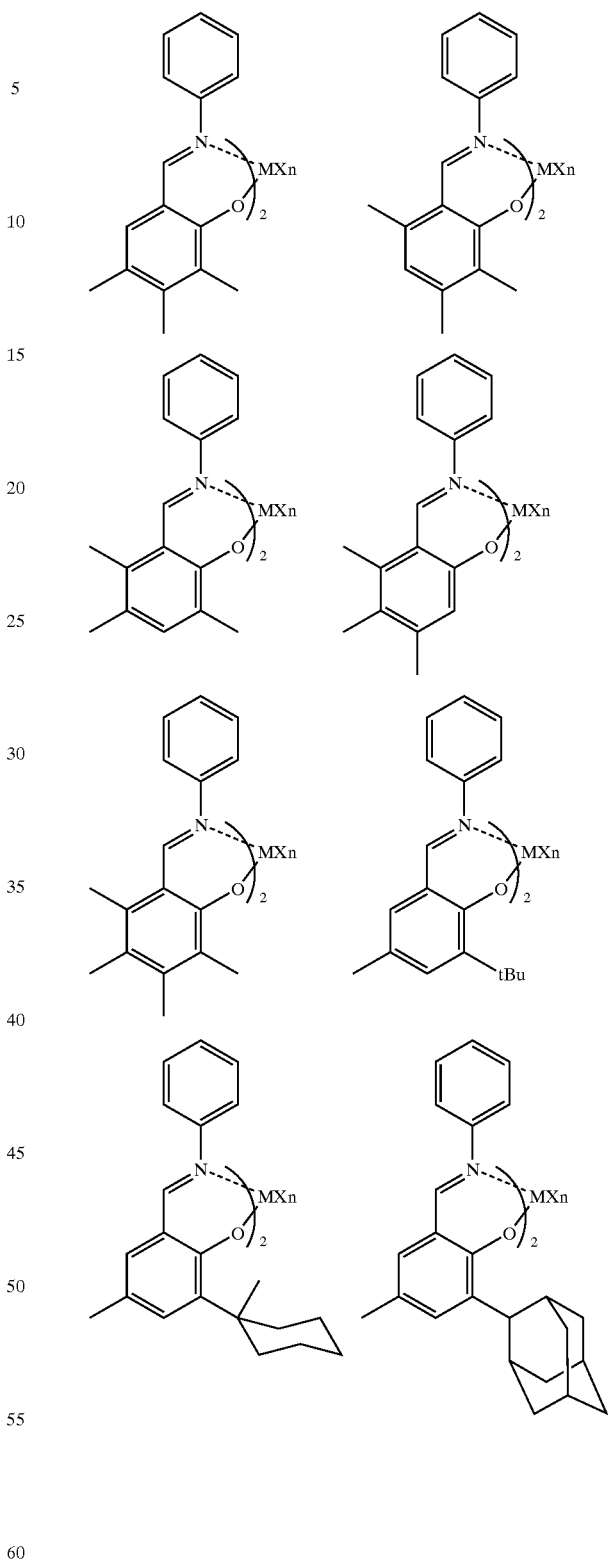

-continued
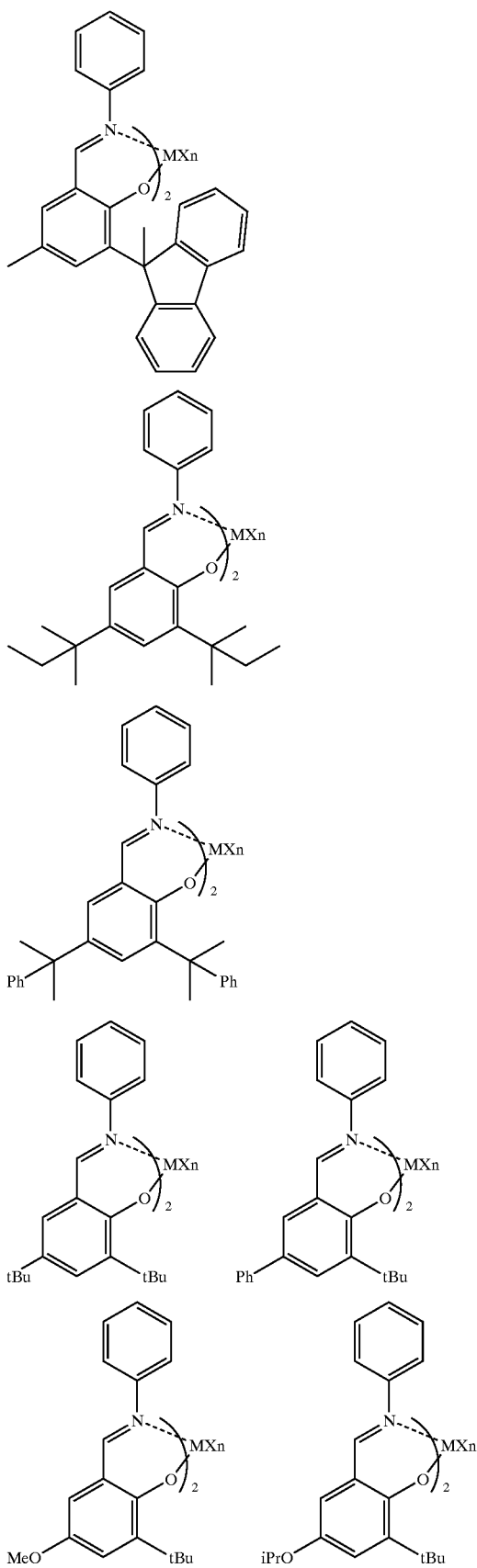
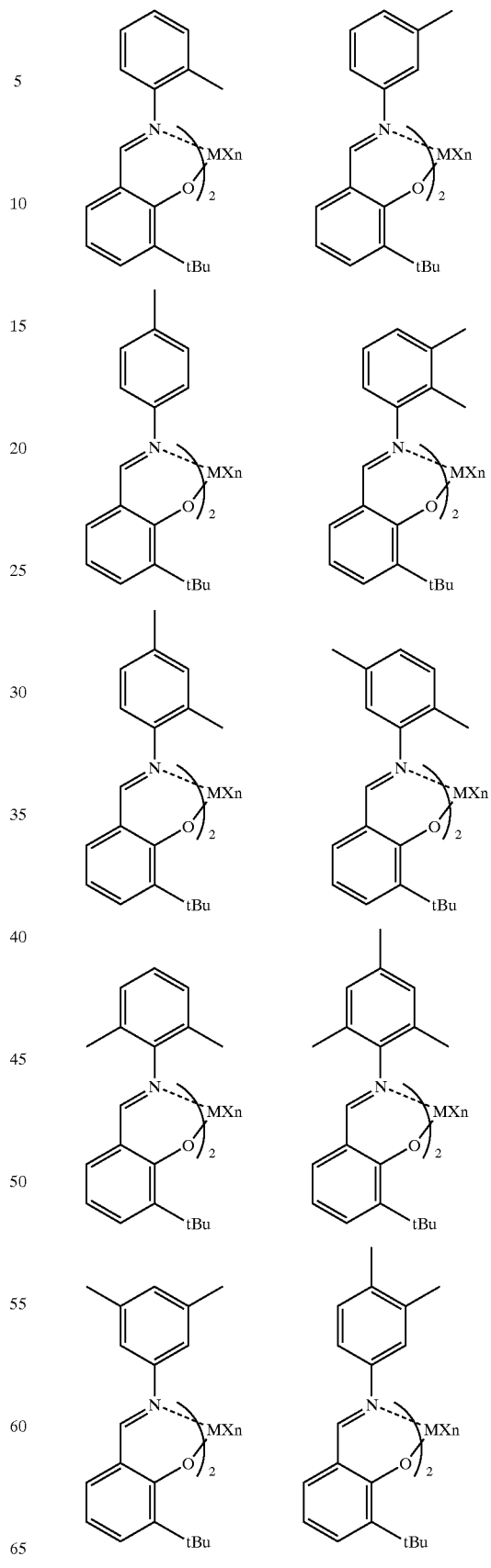

-continued
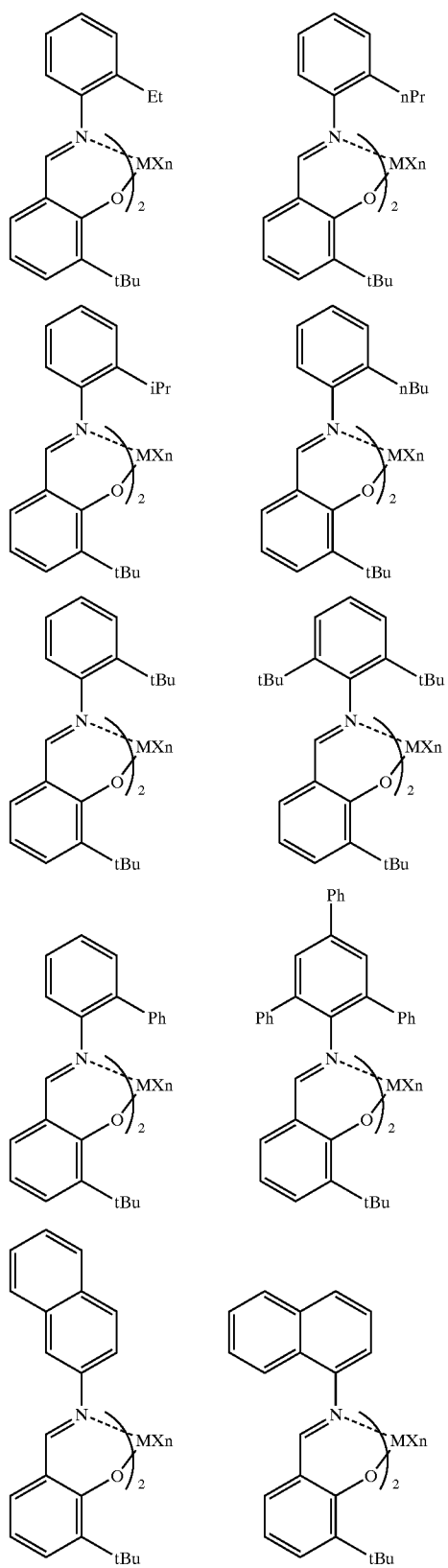
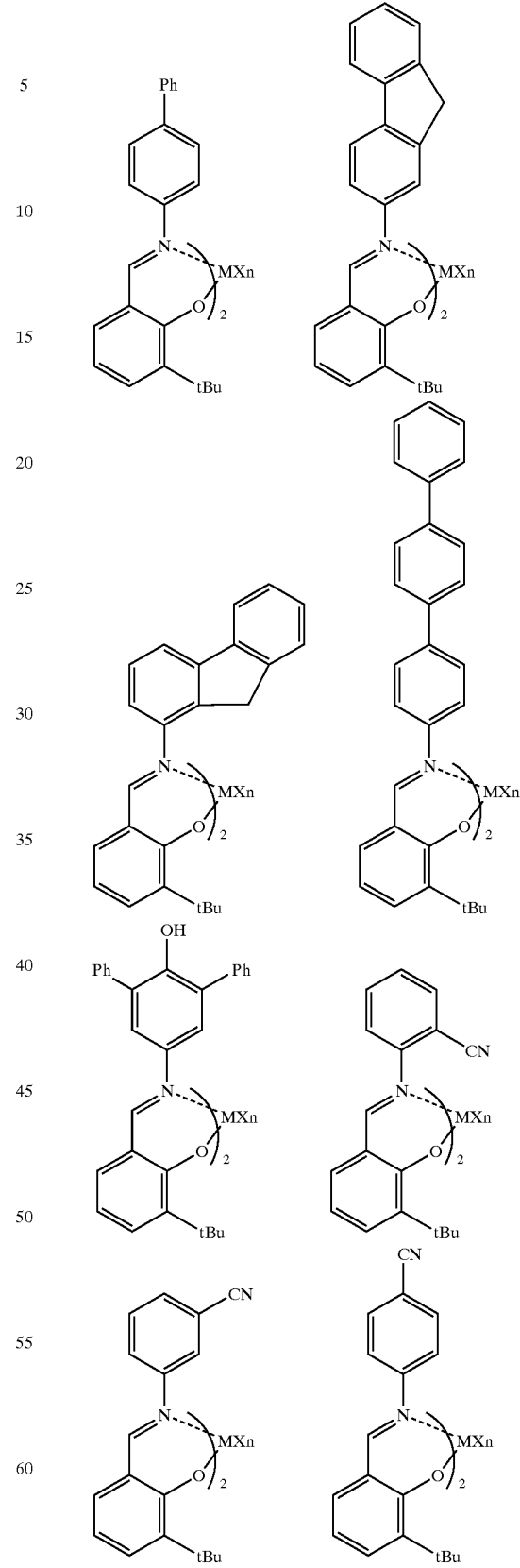

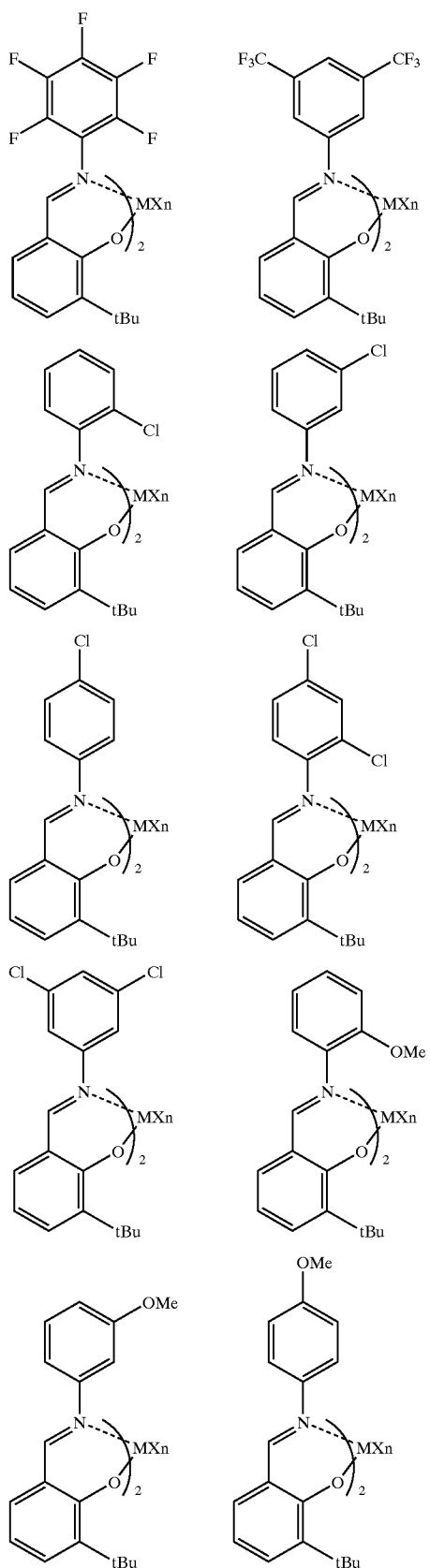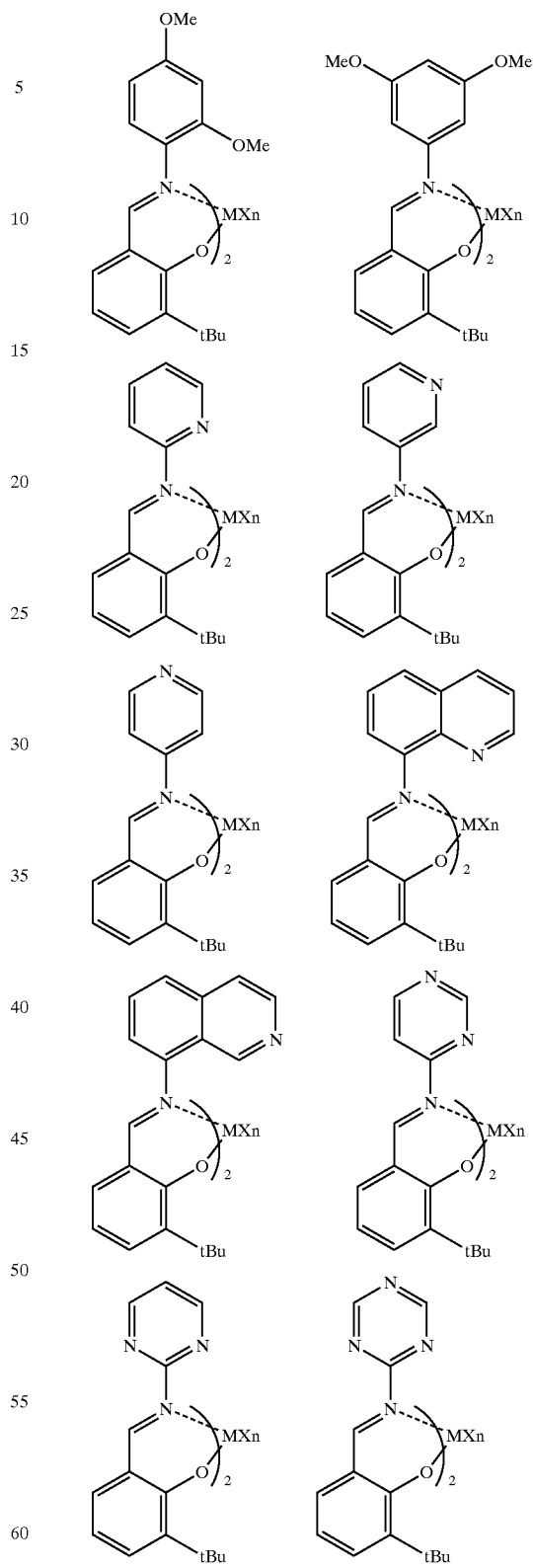

-continued
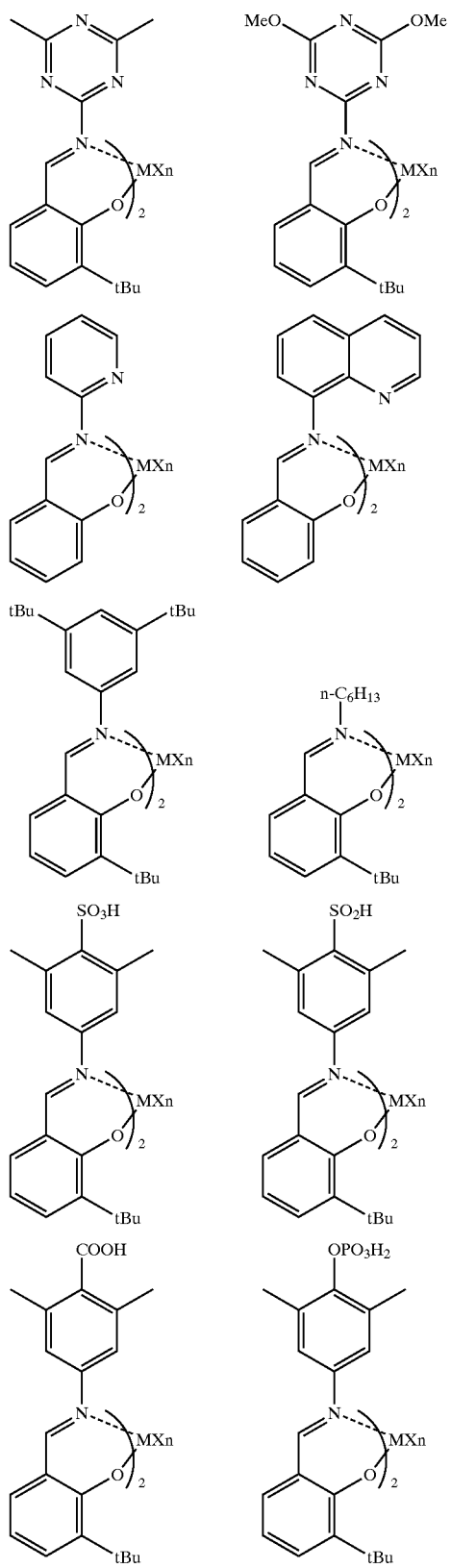
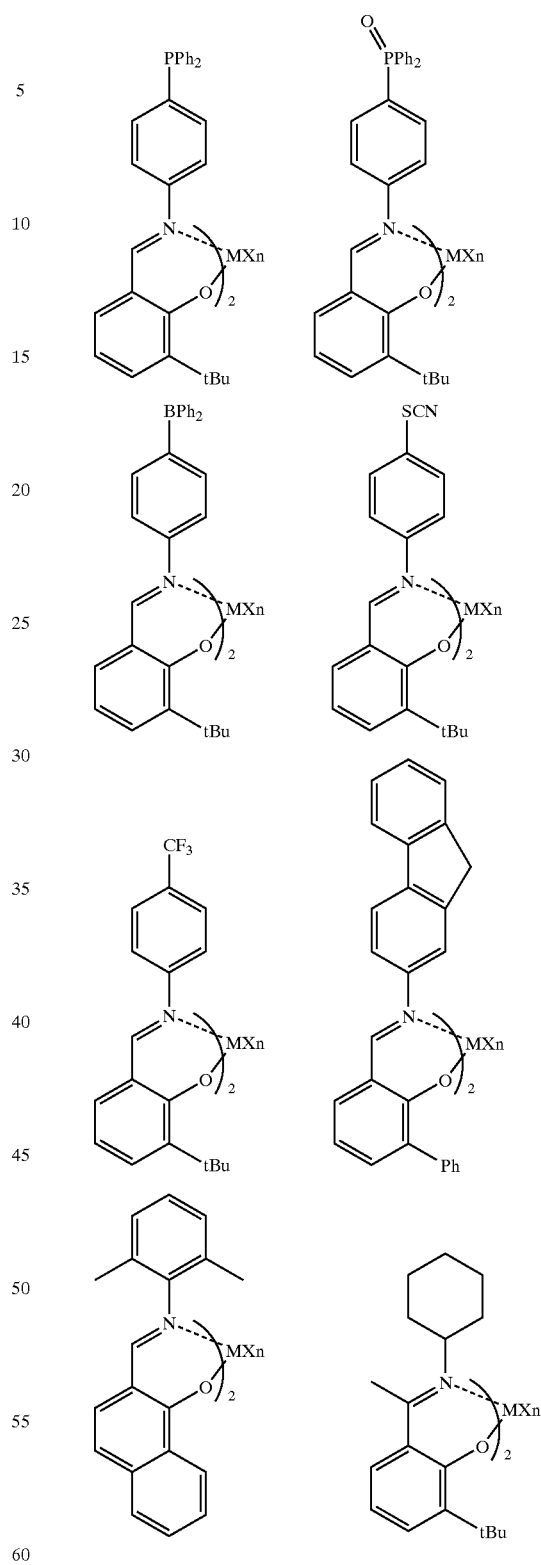

-continued
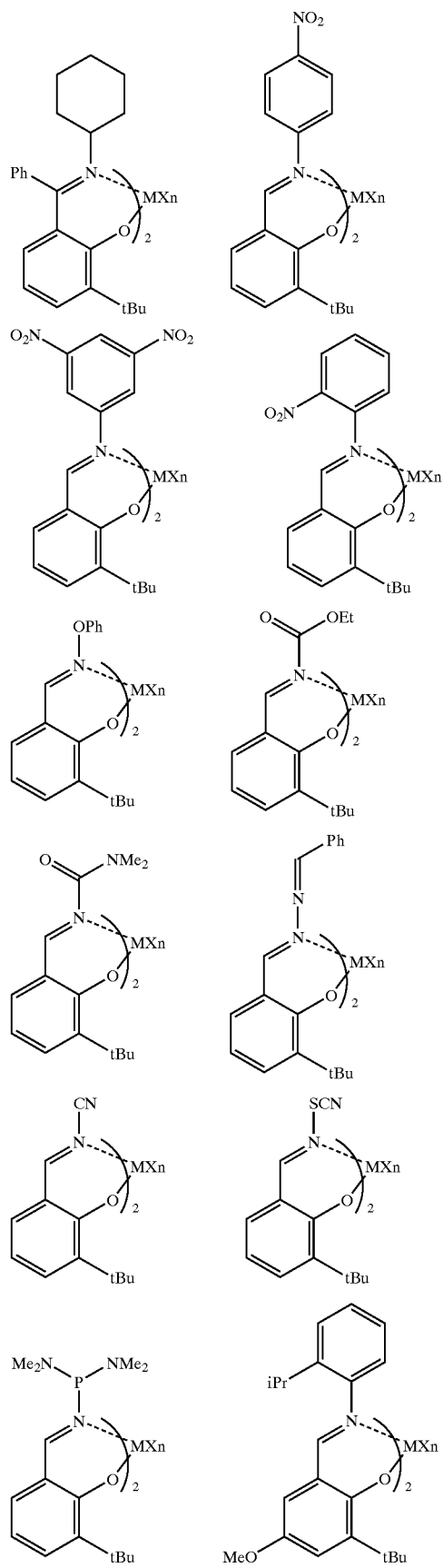
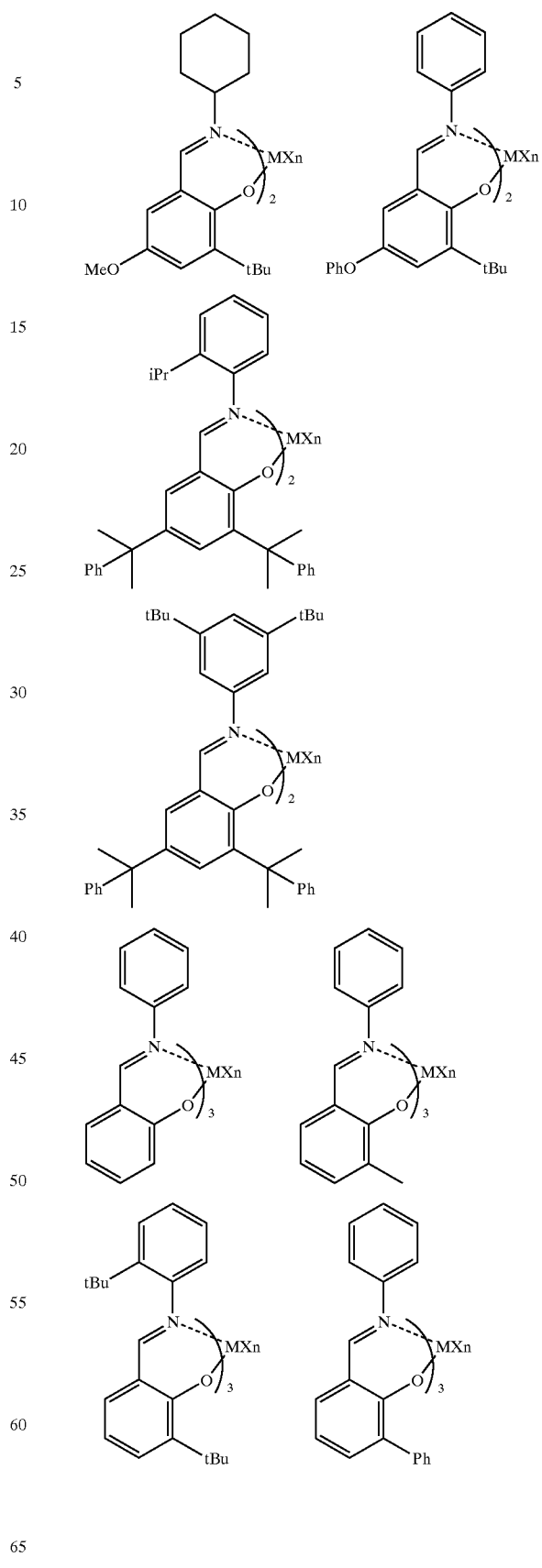

-continued
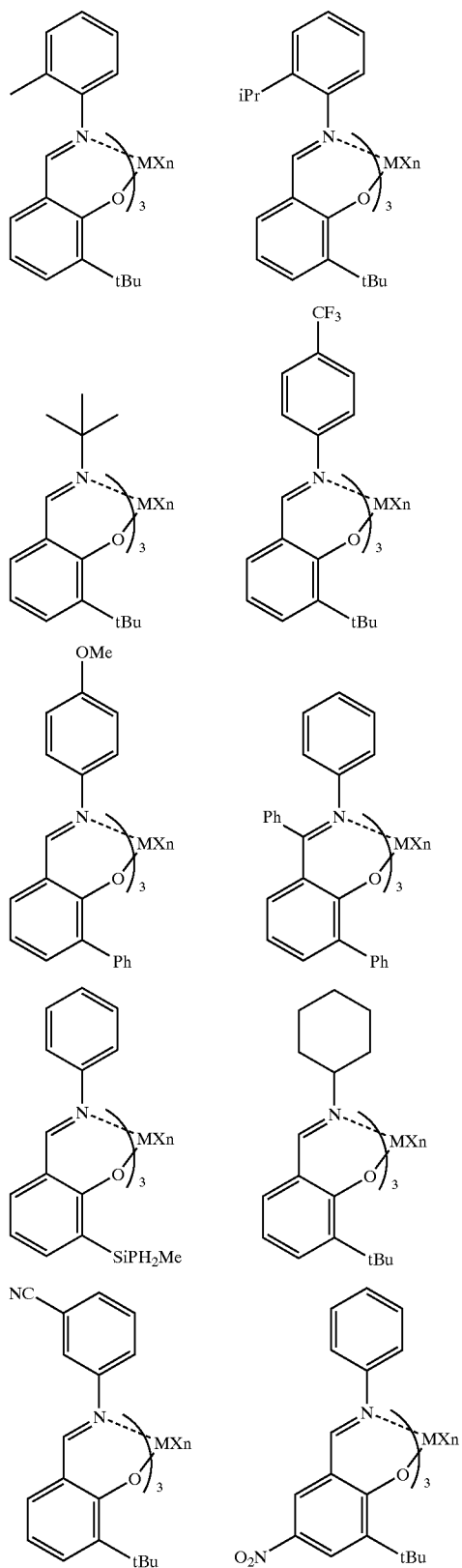
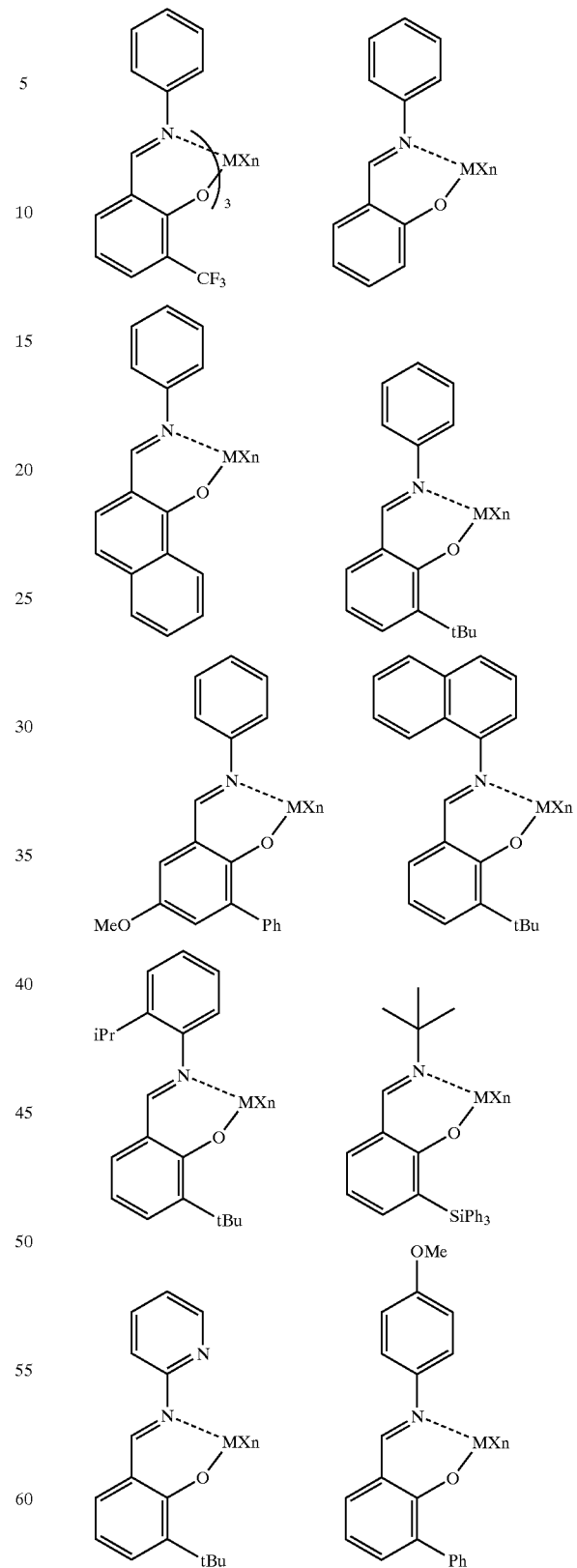

-continued

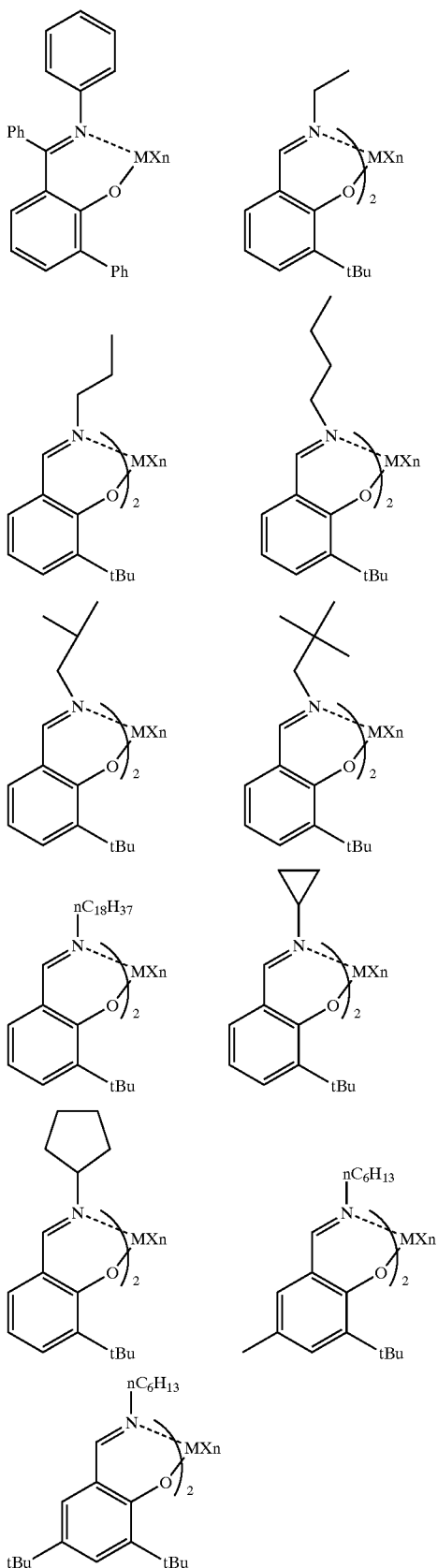

-continued

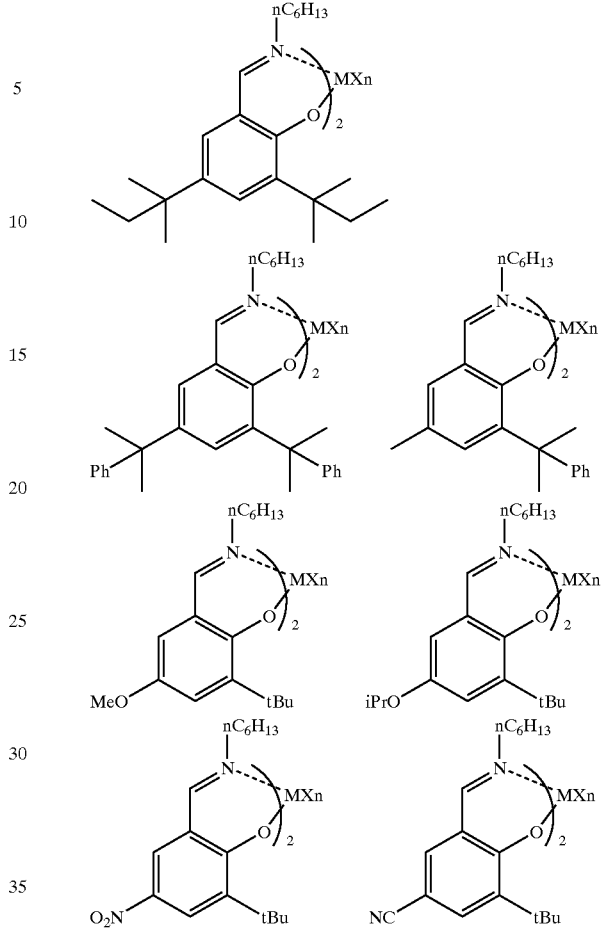

In the above examples, Me denotes a methyl group, Et denotes an ethyl group, iPr denotes an i-propyl group, t-Bu denotes a tert-butyl group, and Ph denotes a phenyl group.

Of the transition metal compound (A) represented by the formula (I), a compound wherein m is 2 and two of $R^1$ are bonded is represented by the following formula (I-b).

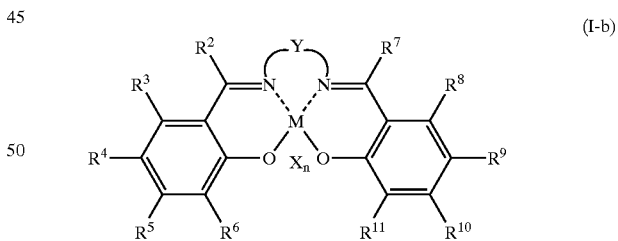

(I-b)

In the above formula, M is a transition metal atom of Group 3 to Group 11 of the period table and is specifically the same transition metal atom as previously described with respect to M in the formula (I).

$R^2$ to $R^{11}$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring. Examples of the groups indicated by $R^2$ to $R^{11}$ include the same atoms and groups as previously described with respect to $R^1$ to $R^6$ in the formula (I).

In the formula (I-b), at least one of $R^6$ and $R^{11}$, particularly each of them, is preferably a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group.

n is a number satisfying a valence of M and is the same as n in the formula (I).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Specifically, X is the same atom or group as previously described with respect to X in the formula (I).

When n is 2 or greater, plural groups indicated by X may be the same or different, and two or more groups indicated by X may be bonded to each other to form a ring. The ring formed from the thus bonded two or more groups indicated by X may be an aromatic ring or an aliphatic ring.

X is particularly preferably a halogen atom, a hydrocarbon group of 1 to 20 carbon atoms or a sulfonato group.

Y is at least one atom selected from the group consisting of oxygen, sulfur, carbon, nitrogen, phosphorus, silicon, selenium, tin and boron, or a divalent bonding group containing these atoms.

The bonding group Y may have a substituent group, and has a structure wherein the main chain is constituted of preferably 3 or more atoms, more preferably 4 to 20 atoms, particularly preferably 4 to 10 atoms.

Examples of atoms and groups indicated by Y include chalcogen atoms such as —O—, —S— and —Se—; nitrogen- or phosphorus-containing groups, such as —NH—, —N(CH$_3$)—, —PH— and —P(CH$_3$)—; silicon-containing groups, such as —SiH$_2$— and —Si(CH$_3$)$_2$—; tin containing groups, such as —SnH$_2$— and —Sn(CH$_3$)$_2$—; and boron-containing group, such as —BH—, —B(CH$_3$)— and —BF—. Examples of the carbon-containing groups indicated by Y include saturated hydrocarbon groups of 3 to 20 carbon atoms, such as —(CH$_2$)$_4$—, —(CH$_2$)$_5$— and —(CH$_2$)$_6$—; cyclic saturated hydrocarbon groups, such as a cyclohexylidene groups and a cyclohexylene group; groups wherein these saturated hydrocarbon groups are partly substituted with hydrocarbon groups of 1 to 10 carbon atoms, halogens such as fluorine, chlorine and iodine, or hetero atoms such as oxygen, sulfur, nitrogen, phosphorus, silicon, selenium, tin and boron; residual groups of cyclic hydrocarbons of 6 to 20 carbon atoms, such as benzene, naphthalene and anthracene; and residual groups of heterocyclic compounds having 3 to 20 carbon atoms and containing hetero atoms, such as pyridine, quinoline, thiophene and furan.

Examples of the transition metal compounds represented by the formula (I-b) are given below, but the compounds of the formula (I-b) are not limited to those examples.

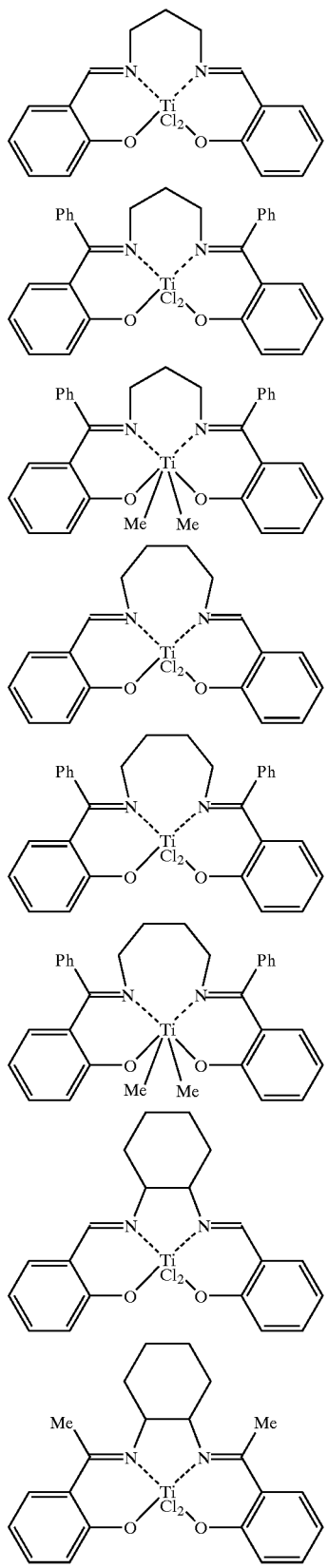

-continued
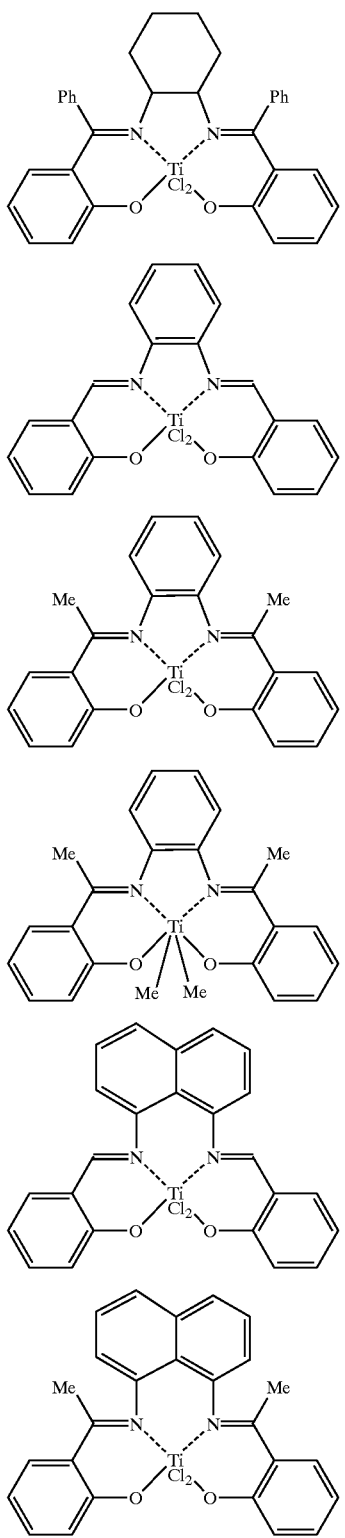
-continued
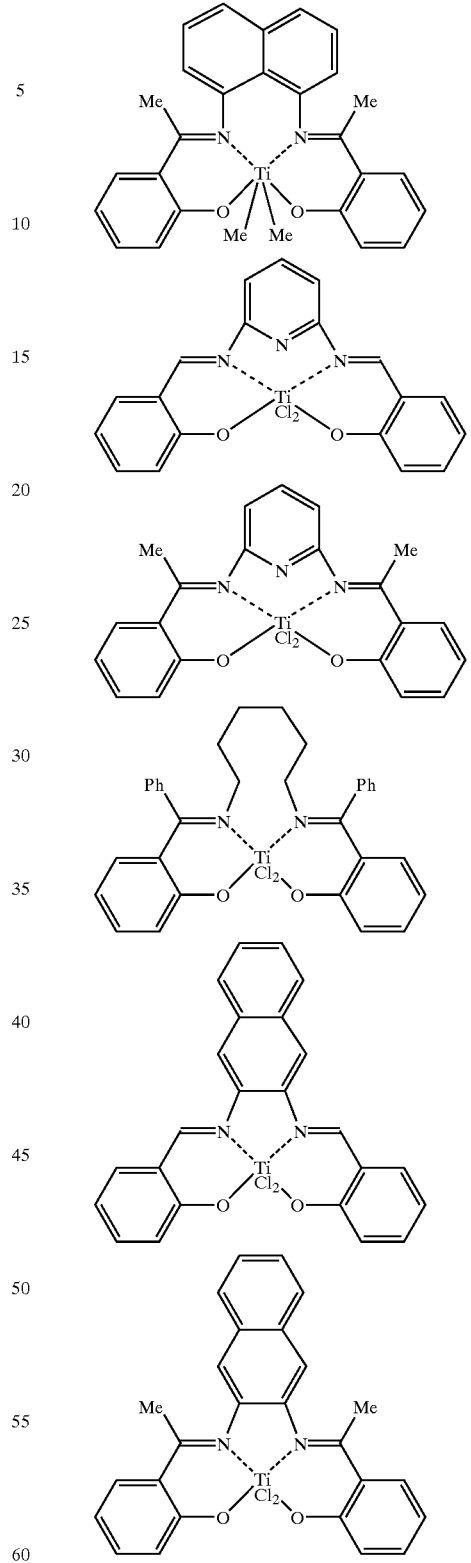

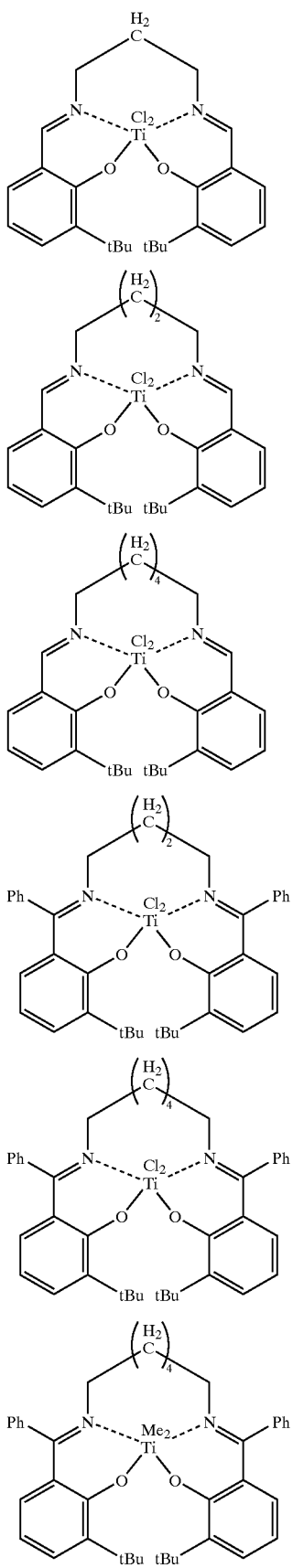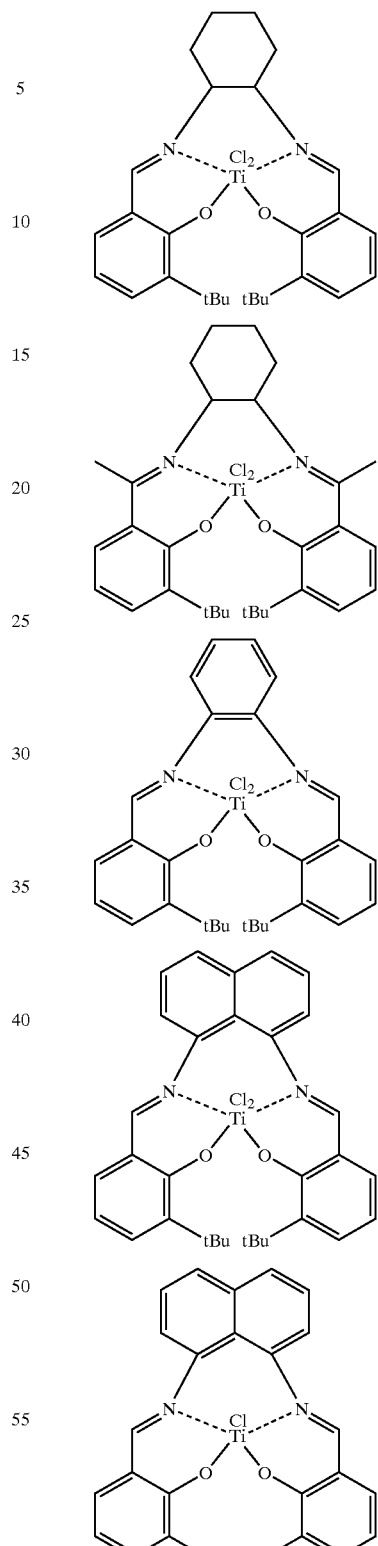

-continued

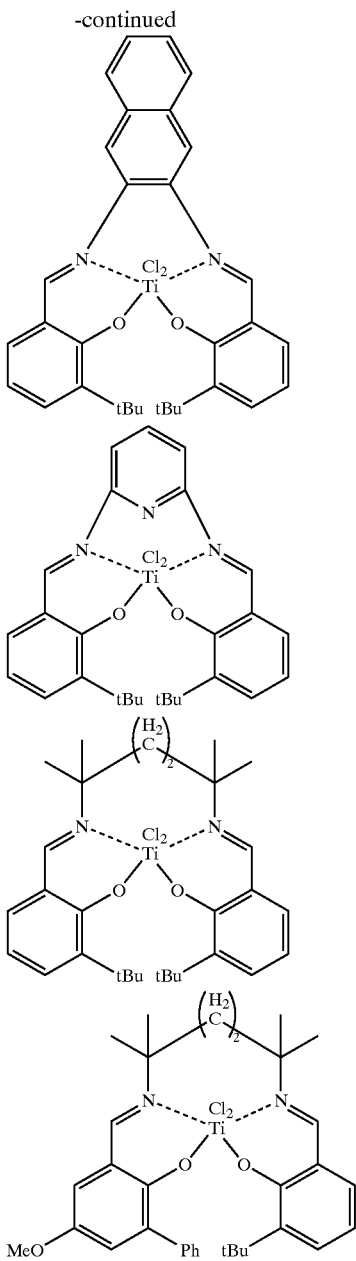

In the above examples, Me denotes a methyl group, and Ph denotes a phenyl group.

In the present invention, transition metal compounds wherein the titanium metal is replaced with a metal other than titanium, such as zirconium or hafnium, are also employable.

(B-1) Organometallic Compound

Examples of the organometallic compounds (B-1) used in the preparation of the ethylene/α-olefin copolymer include the below-described organometallic compounds containing metals of Group 1, Group 2, Group 12 and Group 13 of the periodic table.

(B-1a) Organoaluminum compound represented by the following formula:

$$R^a{}_mAl(OR^b)_nH_pX_q$$

wherein $R^a$ and $A^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leq3$, $0\leq n<3$, $0\leq p<3$, $0\leq q<3$ and $m+n+p+q=3$.

(B-1b) Alkyl complex compound comprising a metal of Group 1 of the periodic table and aluminum, which is represented by the following formula:

$$M^2AlR^a{}_4$$

wherein $M^2$ is Li, Na or K; and $R^1$ is a hydrocarbon group of 1 to 15 carbon atoms, preferably 1 to 4 carbon atoms.

(B-1c) Dialkyl compound containing a metal of Group 2 or Group 12 of the periodic table, which is represented by the following formula:

$$R^aR^bM^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

$$R^a{}_mAl(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5\leq m\leq 3$;

an organoaluminum compound represented by the following formula:

$$R^a{}_mAlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$:

an organoaluminum compound represented by the following formula:

$$R^a{}_mAlH_{3-m}$$

wherein $R^a$ is a hydrocarbon group of 1 to 15 carbon atoms, preferably 1 to 4 carbon atoms, and m is preferably a number satisfying the condition of $2\leq m<3$:

and an organoaluminum compound represented by the following formula:

$$R^a{}_mAl(OR^b)_nX_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m\leq3$, $0\leq n<3$, $0\leq q<3$ and $m+n+q=3$.

Specific examples of the organoaluminum compounds (B-1a) include:

Tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolyaluminum;

dialkylaluminum hydrides, such as diisobutylaluminum hydride;

trialkenylaluminums represented by the formula (i-C$_4$H$_9$)$_x$Al$_y$(C$_5$H$_{10}$)$_z$ (wherein x, y and z are each a positive number, and z$^{155}$ 2x) or the like, such as triisoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition, which are represented by R$^a{}_{2.5}$Al(OR$^b$)$_{0.5}$ or the like;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylaluminum(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminum, e.g., alkylaluminum dihalide, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as (C$_2$H$_5$)$_2$AlN(C$_2$H$_5$)Al(C$_2$H$_5$)$_2$.

Examples of the compounds (B-1b) include LiAl (C$_2$H$_5$)$_4$ and LiAl (C$_7$H$_{15}$)$_4$.

Other compounds, such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium, are also employable as the organometallic compounds (B-1).

Combinations of compounds capable of forming the above-mentioned organoaluminum compounds in the polymerization system, e.g., a combination of halogenated aluminum and alkyllithium and a combination of halogenated aluminum and alkylmagnesium, are also employable.

Or the organometallic compounds (B-1), the organoaluminum compounds are preferable.

The organometallic compounds (B-1) mentioned above are used singly or in combination of two or more kinds.

(B-2) Organoaluminum Oxy-compound

The organoaluminum oxy-compound (B-2) used in the preparation of the ethylene/α-olefin copolymer (b) may be conventional aluminoxane or such a benzene-insoluble organoaluminum oxy-compound as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene, or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously exemplified with respect to the oraganoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Also employable are ethers such as ethyl ether and tetrahydrofuran. Of the solvents, particularly preferable are aromatic hydrocarbons and aliphatic hydrocarbons.

The benzene-insoluble organoaluminum oxy-compound is preferably one containing an Al component that is soluble in benzene at 60° C. in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound is, for example, an organoaluminum oxy-compound containing boron, which is represented by the following formula (i):

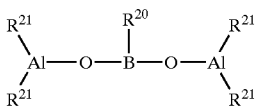

(i)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum oxy-compound containing boron, which is represented by the formula (i), can be prepared by allowing an alkylboronic acid represented by the following formula (ii) to react with an organoaluminum compound in an inert solvent at a temperature of −80° C. to room temperature for 1 minute to 24 hours under an inert gas atmosphere.

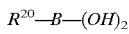 (ii)

wherein $R^{20}$ is the same group as described above.

Examples of the alkylboronic acids represented by the formula (ii) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl) phenylboronic acid. Of these, preferable are methylboronic acid, n-butylboronic acid, isobutylboronic acid, 3,5-difluorophenylboronic acid and pentafluorophenylboronic acid.

These alkylboronic acids are used singly or in combination of two or more kinds.

Examples of the organoaluminum compounds to be reacted with the alkylboronic acid include the same organoaluminum compounds as previously exemplified with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound Which Reacts with the Transition Metal Imine Compounds (A) to Form Ion Pair The compound (B-3) which reacts with a transition metal imine compound (A) to form an ion pair (referred to as an "ionizing ionic compound" hereinafter), that is used for preparing the ethylene/α-olefin copolymer (b), is a compound which reacts with the aforesaid transition metal compound (A) to form an ion pair. Therefore, any compound which forms an ion pair by the contact with at least the transition metal imine compound (A) is included in this compound.

Examples of such compounds include Lewis acid, an ionic compound, a borane compound and a carborane compound described in Japanese Patent Laid-Open Publication No. 501950/1989, No. 502036/1989, No. 179005/1991, No. 179006/1991, No. 207703/1991 and No. 207704/1991, U.S. Pat. No. 5,321,106, etc. A heteropoly compound and an isopoly compound are also available.

The Lewis acid is specifically a compound represented by $BR_3$ (R is fluorine or a phenyl group which may have a substituent group such as fluorine, methyl or trifluromethyl). Examples of such compounds include trifluoroboron, triphenylboron, tris(4-fluorophenyl)boron, tris(3,5-difluorophenyl)boron, tris(4-fluoromethylphenyl)boron, tris (pentafluorophenyl) boron, tris(p-tolyl)boron, tris(o-tolyl) boron and tris(3,5-dimethylphenyl)boron.

The ionic compound is, for example, a compound represented by the following formula (VI).

(VI)

In the above formula, $R^{22}$ is $H^+$, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cations include tri-substituted carbonium cations, such as tripenylcarbonium cation, tri (methylphenyl)carbonium cation and tri(dimethylphenyl) carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri (dimethylphenyl)phosphonium cation.

$R^{22}$ is preferably carbonium cation, ammonium cation or the like, particularly preferably triphenylcarbonium cation, N,N-dimethylanilinium cation or N,N-diethylanilinium cation.

Also available as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl) ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylanilinumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compound is triphenylcarbeniumtetrakis(pentafluorophenyl)borate, N,N- dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex or a boron compound represented by the following formula (VII) or (VIII).

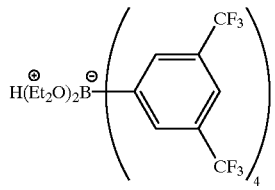

(VII)

wherein Et is an ethyl group.

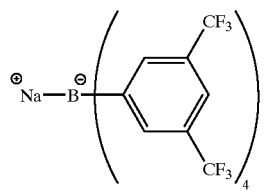

(VIII)

Examples of the borane compounds include:
decaborane (14);
salts of anions, such as bis(tri(n-butyl)ammonium) nonaborate, bis(tri(n-butyl)ammonium)decaborate, bis(tri(n-butyl)ammonium)undecaborate, bis(tri(n-butyl)ammonium)dodecaborate, bis(tri(n-butyl)ammonium)decachlorodecaborate and bis(tri(n-butyl)ammonium)dodecachlorododecaborate; and
salts of metallic borane anions, such as tri(n-butyl)ammoniumbis(dodecahydridododecaborate)cobaltate (III) and bis(tri(n-butyl)ammonium)bis-(dodecahydridododecaborate)nickelate(III).
Examples of the carborane compounds include:
salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, (tri(n-butyl) ammonium-1-carbadecaborate, (tri(n-butyl) ammonium-1-carbaundecaborate, (tri(n-butyl) ammonium-1-carbadodecaborate, (tri(n-butyl) ammonium-1-trimethylsilyl-1-carbadecaborate, (tri(n-butyl)ammoniumbromo-1-carbadodecaborate, (tri(n-butyl)ammonium-6-carbadecaborate(14), (tri(n-butyl) ammonium-6-carbadecaborate(12), (tri(n-butyl) ammonium-7-carbaundecaborate(13), (tri(n-butyl) ammonium-7,8-dicarbaundecaborate(12), (tri(n-butyl) ammonium-2,9-dicarbaundecaborate(12), (tri(n-butyl) ammoniumdodecahydrido-8-methyl-7,9-dicarbaundecaborate, (tri(n-butyl) ammoniumundecahydrido-8-ethyl-7,9-dicarbaundecaborate, (tri(n-butyl) ammoniumundecahydrido-8-butyl-7,9-dicarbaundecaborate, (tri(n-butyl) ammoniumundecahydrido-8-allyl-7,9-dicarbaundecaborate, (tri(n-butyl) ammoniumdecahydrido-9-trimethylsilyl-7,8-dicarbaundecaborate and (tri(n-butyl) ammoniumundecahydrido-4,6-dibromo-7-carbaundecaborate; and salts of metallic carborane anions, such as (tri(n-butyl) ammoniumbis(nonahydrido-1,3-dicarbanonaborate) cobaltate (III), (tri(n-butyl)ammoniumbis (undecahydrido-7,8-dicarbaundecaborate)ferrate(III), (tri(n-butyl)ammoniumbis(undecahydrido-7,8-dicarbaundecaborate)cobaltate(III), (tri(n-butyl) ammoniumbis(undecahydrido-7,8-dicarbaundecaborate)nickelate(III), (tri(n-butyl) ammoniumbis(undecahydrido-7,8-dicarbaundecaborate)cuprate(III), (tri(n-butyl) ammoniumbis(undecahydrido-7,8-dicarbaundecaborate)aurate(III), (tri(n-butyl) ammoniumbis(nonahydrido-7,8-dimethyl-7,8-dicarbaundecaborate)ferrate(III), (tri(n-butyl) ammoniumbis(nonahydrido-7,8-dimethyl-7,8-dicarbaundecaborate)chromate(III), (tri(n-butyl) ammoniumbis(tribromooctahydrido-7,8-dicarbaundecaborate)cobaltate(III), tris (tri(n-butyl) ammonium)bis(undecahydrido-7-carbaundecaborate) chromate(III), bis(tri(n-butyl)ammonium)bis (undecahydrido-7-carbaundecaborate)manganate(IV), bis(tri(n-butyl)ammonium)bis(undecahydrido-7-carbaundecaborate)cobaltate(III) and bis(tri(n-butyl) ammonium)bis(undecahydrido-7-carbaundecaborate) nickelate(IV).

The heteropoly compound comprises an atom selected from silicon, phosphorus, titanium, germanium, arsenic and tin and one or more atoms selected from vanadium, niobium, molybdenum and tungsten. Examples of the heteropoly compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid and phosphomolybdoniobic acid. Salts of these heteropoly acids, e.g., salts of these acids and metals of Group 1 or 2 of the periodic table such as lithium, sodium, potassium, rubidium, cesium, beryllium, magnesium, calcium, strontium and barium, and organic salts such as triphenylethyl salt, are also available as the heteropoly compounds.

The ionizing ionic compounds (B-3) mentioned above are used singly or in combination of two or more kinds.

(C) Vanadium compound

The vanadium compound used in the preparation of the ethylene/α-olefin copolymer (c) is represented by the following formula (II):

$$VO(OR)_nX_{3-n} \qquad (II)$$

wherein R is an aliphatic hydrocarbon residual group such as a straight-chain or branched alkyl group, X is a halogen atom, and $0 \leq n \leq 3$.

Examples of the vanadium compounds include $VOCl_3$, $VOBr_3$, $VO(OCH_3)Cl_2$, $VO(OCH_3)_2Cl$, $VO(OCH_3)_3$, $VO(OC_2H_5)Cl_2$, $VO(OC_2H_5)_{1.5}Cl_{1.5}$, $VO(OC_2H_5)_{1.5}Br_{1.5}$, $VO(OC_2H_5)_2Cl$, $VO(OC_2H_5)_3$, $VO(OC_3H_7)Cl_2$, $VO(OC_3H_7)_{1.5}Cl_{1.5}$, $VO(OC_3H_7)_2Cl$, $VO(OC_3H_7)_3$, VO(O—n—$C_4H_9$)$_3$, VO(O—n—$C_4H_9$)$Cl_2$, VO(O—isoC$_4$H$_9$)$_2$Cl, VO(O—secC$_4$H$_9$)$_3$, VO(OC$_5$H$_{11}$)$_{1.5}$Cl$_{1.5}$, and mixtures thereof.

Of these, a vanadium compound of the above formula (II) wherein n is a number satisfying the condition of $0 \leq n \leq 2$ is preferably employed, and a vanadium compound wherein R is $C_2H_5$ is particularly preferably employed. These vanadium compounds can be easily prepared by reacting VOCl$_3$ with an alcohol or VOCl$_3$ with VO(OR)$_3$.

(D) Organoaluminum compound

The organoaluminum compound (D) used in the preparation of the ethylene/α-olefin copolymer (c) is the same as the aforesaid organoaluminum compound (B-1a) represented by the formula $R^a{}_m Al(OR^b)_n H_p X_q$.

(E) Metallocene compound

The metallocene compound containing a metal of Group 4 of the periodic table and containing a ligand having cyclopentadienyl skeleton, which is used for preparing the ethylene/α-olefin copolymer (c), is represented by the following formula (III).

$$M^1 L_x \qquad (III)$$

In the above formula, $M^1$ is a transition metal atom selected from Group 4 of the periodic table, specifically zirconium, titanium or hafnium, preferably zirconium.

x is a number satisfying a valence of the transition metal atom $M^1$ and represents the number of ligands L coordinated to the transition metal atom $M^1$.

L is a ligand coordinated to the transition metal atom, at least one ligand L is a ligand having cyclopentadienyl skeleton, and a ligand L other than the ligand having cyclopentadienyl skeleton is a hydrocarbon group of 1 to 20 carbon atoms, a halogenated hydrocarbon group of 1 to 20 carbon atoms, an oxygen-containing group, a sulfur-containing group, a silicon-containing group, a halogne atom or a hydrogen atom.

Examples of the ligands having cyclopentadienyl skeleton includes a cyclopentadienyl group; alkyl-substituted cyclopentadienyl groups, such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl group; an indenyl group; a 4,5,6,7-tetrahydroindenyl group; and a fluorenyl group. These groups may be substituted with a (halogenated) hydrocarbon group of 1 to 20 carbon atoms, an oxygen-containing group, a sulfur-containing group, a silicon-containing group, a halogen atom or the like.

When the compound represented by the formula (III) contains two or more ligands having cyclopentadienyl skeleton, two of them may be bonded through a divalent bonding group such as a (substituted) alkylene group or a (substituted) silylene group.

Examples of the ligands L other than the ligand having cyclopentadienyl skeleton are given below.

Examples of the hydrocarbon groups of 1 to 20 carbon atoms include alkyl groups, cycloalkyl groups, alkenyl groups, arylalkyl groups and aryl groups. More specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenylyl, naphthyl, methylnaphthyl, anthryl and phenanthryl.

Examples of the halogenated hydrocarbon groups of 1 to 20 carbon atoms include groups wherein the above hydrocarbon groups of 1 to 20 carbon atoms are substituted with halogens.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above-mentioned oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritrolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the halogen atoms include a flourine atom, a chlorine atom, a bromine and an iodine atom.

When the valance of the transition metal is 4, the metallocene compound is specifically represented by the following formula (III-a).

$$R^{11}R^{12}R^{13}R^{14}M^1 \qquad (III\text{-}a)$$

In the above formula, $M^1$ is the same transition metal atom selected from Group 4 of the periodic table as previously described, preferably a zirconium atom.

$R^{11}$ is a group (ligand) having cyclopentadienyl skeleton.

$R^{12}$, $R^{13}$ and $R^{14}$ may be the same or different and are each a group (ligand) having cyclopentadienyl skeleton, a (halogenated) hydrocarbon group of 1 to 20 carbon atoms, an oxygen-containing group, a sulfur-containing group, a silicon-containing group, a halogen atom or a hydrogen atom.

Of the metallocene compounds represented by the formula (III-a), a compound wherein at least one of $R^{12}$, $R^{13}$ and $R^{14}$ is a group (ligand) having cyclopentadienyl skeleton, e.g., a compound wherein $R^{11}$ and $R^{12}$ are each a group (ligand) having cyclopentadienyl skeleton, is preferably employed. When $R^{11}$ and $R^{12}$ are each a group (ligand) having cyclopentadienyl skeleton, $R^{13}$ and $R^{14}$ are each preferably a group having cyclopentadienyl skeleton, an alkyl group, a cycloalkyl group, an alkenyl group, an arylalkyl group, an aryl group, an alkoxy group, an aryloxy group, a trialkylsilyl group, a sulfonato group, a halogen atom or a hydrogen atom.

Examples of the metallocene compounds represented by the above formula (III) and having zirconium as $M^1$ include: bis(indenyl)zirconium dichloride, bis(4,5,6,7-tetrahydroindenyl)zirconium dichloride, bis (cyclopentadienyl)zirconium dichloride, bis (dimethylcyclopentadienyl)zirconium dichloride, bis (methylbutylcyclopentadienyl)zirconium dichloride, ethylenebis(indenyl)zirconium dichloride and dimethylsilylenebis(indenyl)zirconium dichloride.

Compounds wherein zirconium is replaced with titanium of hafnium in the above-mentioned zirconium compounds are also employable.

A compound represented by the following formula (IV) is also employable as the metallocene compound (E).

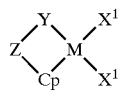

In the above formula (IV), $M^1$ is a transition metal atom of Group 4 of the periodic table, specifically zirconium, titanium or hafnium, preferably zirconium.

Each $X^1$ is the same or different and is a hydrogen atom, a halogen atom, a hydrocarbon group containing 20 or less carbon atoms, a silyl group containing 20 or less silicon atoms, or a germyl group containing 20 or less germanium atoms.

Cp is a substituted cyclopentadienyl group π-bonded to $M^1$ or its derivative.

Z is a ligand containing an oxygen atom, a sulfur atom, a boron atom or an element of Group 14 of the periodic table, e.g., $-Si(R^{15}_2)-$, $-C(R^{15}_2)-$, $-Si(R^{15}_2)Si(R^{15}_2)-$, $-C(R^{15}_2)C(R^{15}_2)-$, $-C(R^{15}_2)C(R^{15}_2)C(R^{15}_2)-$, $-C(R^{15})=C(R^{15})-$, $-C(R^{15}_2)Si(R^{15}_2)-$ or $-Ge(R^{15}_2)-$.

Y is a ligand containing nitrogen atom, a phosphorus atom, an oxygen atom or a sulfur atom, e.g., $-N(R^{16})-$, $-O-$, $-S-$ or $-P(R^{16})-$.

Z and Y may together form a condensed ring.

$R^{15}$ is a group selected from a hydrogen atom, an alkyl group having up to 20 non-hydrogen atoms, an aryl group having up to 20 non-hydrogen atoms, a silyl group having up to 20 non-hydrogen atoms, a halogenated alkyl group having up to 20 non-hydrogen atoms, a halogenated aryl group having up to 20 non-hydrogen atoms and combinations thereof. $R^{16}$ is an alkyl group of 1 to 10 carbon atom, an aryl group of 6 to 10 carbon atoms or an aralkyl group of 7 to 10 carbon atoms, or forms a condensed ring system having up to 30 non-hydrogen atoms together with one or more $R^{15}$.

Examples of the metallocene compounds represented by the formula (IV) include:

(tert-butylamido)(tetramethyl-η⁵-cyclopentadienyl)-1,2-ethanediylzirconium dichloride, (tert-butylamido)(tetramethyl-η⁵-cyclopentadienyl)-1,2-ethanediyltitanium dichloride, (methylamido)(tetramethyl-η⁵-cyclopentadienyl)-1,2-ethanediylzirconium dichloride, (methylamido)(tetramethyl-η⁵-cyclopentadienyl)-1,2-ethanediyltitanium dichloride, (ethylamido)(tetramethyl-η⁵-cyclopentadienyl)-methylenetitanium dichloride, (tert-butylamido)dimethyl(tetramethyl-η⁵-cyclopentadienyl)silanetitanium dichloride, (tert-butylamido)dimethyl(tetramethyl-η⁵-cyclopentadienyl)silanezirconium dichloride, (benzylamido)dimethyl(tetramethyl-η⁵-cyclopentadienyl)silanetitanium dichloride and (phenylphosphido)dimethyl(tetramethyl-η⁵-cyclopentadienyl)silanezirconium dibenzyl.

The organometallic compound (B-1) used in the preparation of the ethylene/α-olefin copolymer (c) is the same as the aforesaid organometallic compound (B-1) used in the preparation of the ethylene/α-olefin copolymer (b).

The organoaluminum oxy-compound (B-2) used in the preparation of the ethylene/α-olefin copolymer (c) is the same as the aforesaid organoaluminum oxy-compound (B-2) used in the preparation of the ethylene/α-olefin copolymer (b).

The compound (B-3) which reacts with the metallocene compound (E) to form an ion pair, that is used in the preparation of the ethylene/α-olefin copolymer (c), is the same as the aforesaid compound (B-3) which reacts with the transition metal imine compound (A) to form an ion pair, that is used in the preparation of the ethylene/α-olefin copolymer (b).

Next, the processes for preparing the ethylene/α-olefin copolymer (b) and the ethylene/α-olefin copolymer (c) are described.

In the preparation of the ethylene/α-olefin copolymer (b), the components can be used in any way and in any order. For example, the following processes are available.

(1) The component (A) and at least one compound (B) selected from the organometallic compound (B-1), the organoaluminum oxy-compound (B-2) and the ionizing ionic compound (B-3) (referred to as a "component (B)" simply hereinafter) are fed to the polymerization reactor in an arbitrary order.

(2) A catalyst component obtained by previously contacting the component (A) with the component (B-1), and the component (B-3) are fed to the polymerization reactor in an arbitary order.

(3) A catalyst component obtained by previously contacting the component (A) with the component (B-1), the component (B-1) and the component (B-3) are fed to the polymerization reactor in an arbitary order. In this case, the components (B-1) may be the same or different.

(4) A catalyst component obtained by previously contacting the component (A), the component (B-1) and the component (B-3) with one another, and the component (B-1) are fed to the polymerization reactor in an arbitrary order. In this case, the components (B-1) may be the same or different.

(5) A catalyst obtained by previously contacting the component (A) with the component (B-2) is fed to the polymerization reactor.

(6) A catalyst component obtained by previously contacting the component (A) with the component (B-2), and the component (B-1) or (B-2) are fed to the polymerization reactor in an arbitrary order. In this case, the components (B-2) may be the same or different.

Of these, the processes (2), (3) and (4) are preferable.

The polymerization can be carried out as any of liquid phase polymerization, such as solution polymerization or suspension polymerization, and gas phase polymerization.

Examples of inert hydrocarbon media used in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the aforesaid transition metal imine catalyst, the component (A) is used in an amount of usually $10^{-12}$ to $10^{-2}$ mol, preferably $10^{-10}$ to $10^{-3}$ mol, based on 1 liter of the polymerization volume.

The component (B-1) is used in such an amount that the molar ratio ((B-1)/(M)) of the component (B-1) to the transition metal atom (M) in the component (A) becomes usually 0.01 to 100000, preferably 0.05 to 50000. The component (B-2) is used in such an amount that the molar ratio ((B-2)/(M)) of the aluminum atom in the component (B-2) to the transition metal atom (M) in the component (A) becomes usually 10 to 500000, preferably 20 to 100000. The component (B-3) is used in such an amount that the molar ratio ((B-3)/(M)) of the component (B-3) to the transition metal atom (M) in the component (A) becomes usually 1 to 20, preferably 1 to 10, more preferably 1 to 5.

The temperature of the copolymerization using the transition metal imine catalyst is in the range of usually $-50$ to $+200°$ C., preferably 0 to 170° C. The polymerization pressure is in the range of usually atmospheric pressure to 100 kg/cm$^2$, preferably atmospheric pressure to 50 kg/cm$^2$. The copolymerization reaction can be carried out by any of batchwise, semi-continuous and continuous processes. It is possible to conduct the polymerization in two or more stages under different reaction conditions.

The molecular weight of the resulting ethylene/α-olefin copolymer (b) can be regulated by allowing hydrogen to be present in the polymerization system or by changing the polymerization temperature. The molecular weight can be regulated also by changing the type of the component (B).

In the preparation of the ethylene/α-olefin copolymer (c) using the vanadium catalyst as a catalyst, the vanadium compound (C) is used in such an amount that the concentration of the vanadium compound (C) in the polymerization system becomes usually 0.01 to 5 mmol, preferably 0.05 to 3 mmol, based on 1 liter of the polymerization volume. It is preferable to feed the vanadium compound (C) in a concentration of usually not more than 10 times, preferably 1 to 7 times, more preferably 1 to 5 times, the concentration of the vanadium compound (C) present in the polymerization system. The organoaluminum compound (D) is used in such an amount that the molar ratio (Al/V) of the aluminum atom to the vanadium atom in the polymerization system becomes not less than 2, preferably 2 to 50, more preferably 3 to 20.

The vanadium compound (C) and the organoaluminum compound (D) are generally fed after diluted with a hydrocarbon solvent, liquid ethylene or a liquid α-olefin. The vanadium compound (C) is desirably diluted to the above-mentioned concentration. On the other hand, the organoaluminum compound (D) is desirably adjusted to an arbitrary concentration, for example, not more than 50 times the concentration thereof in the polymerization system and then fed to the polymerization system.

The temperature of the copolymerization using the vanadium catalyst is in the range of usually $-50$ to $+200°$ C., preferably 0 to 170° C. The polymerization pressure is in the range of usually atmospheric pressure to 100 kg/cm$^2$, preferably atmospheric pressure to 50 kg/cm$^2$. The polymerization reaction can be carried out by any of batchwise, semi-continuous and continuous processes. It is possible to conduct the polymerization in two or more stages under different reaction conditions.

The molecular weight of the resulting ethylene/α-olefin copolymer (c) can be regulated by allowing hydrogen to be present in the polymerization system or by changing the polymerization temperature.

The ethylene copolymer (a) according to the invention can be prepared by copolymerizing ethylene and an α-olefin of 3 to 20 carbon atoms in the presence of the transition metal imine catalyst and the vanadium catalyst or the metallocene catalyst.

In the preparation of the ethylene copolymer (a) using the transition metal imine catalyst and the vanadium catalyst, the copolymerization can be carried out as any of liquid phase polymerization, such as solution polymerization or suspension polymerization, and gas phase polymerization.

Examples of inert hydrocarbon media used in the liquid phase polymerization include the same inert hydrocarbon media as used in the preparation of the ethyleneα-olefin copolymer (b).

In the copolymerization of ethylene and an α-olefin of 3 to 20 carbon atoms using the transition metal imine catalyst and the vanadium catalyst, the component (A) is used in an amount of usually $10^{-12}$ to $10^{-2}$ mol, preferably $10^{-10}$ to $10^{-3}$ mol, and the component (C) is used in an amount of usually $10^{-8}$ to $10^{-3}$ mol, preferably $10^{-7}$ to $10^{-4}$ mol, based on 1 liter of the reaction volume. The component (A) is used in such an amount that the molar ratio ((A)/(C)) of the component (A) to the component (C) becomes usually 0.0001 to 200, preferably 0.001 to 100.

The component (B-1) is used in such an amount that the molar ratio ((B-1)/(M)) of the component (B-1) to the transition metal atom (M) in the component (A) and the component (C) becomes usually 0.01 to 10000, preferably 0.05 to 50000. The component (B-2) is used in such an amount that the molar ratio ((B)/(M)) of the aluminum atom in the component (B-2) to the transition metal atom (M) in the component (A) becomes usually 10 to 500000, preferably 20 to 100000. The component (B-3) is used in such an amount that the molar ratio ((B-3)/(M)) of the component (B-3) to the transition metal atom (M) in the component (A) becomes usually 1 to 20, preferably 1 to 10, more preferably 1 to 5.

In the polymerization, the components can be used in any way and in any order.

The temperature of the copolymerization using the transition metal imine catalyst and the vanadium catalyst is in the range of usually $-50$ to $+200°$ C., preferably 0 to 170° C. The polymerization pressure is in the range of usually atmospheric pressure to 100 kg/cm$^2$, preferably atmospheric pressure to 50 kg/cm$^2$. The polymerization reaction can be carried out by any of batchwise, semi-continuous and continuous processes. It is possible to conduct the polymerization in two or more stages under different reaction conditions.

The molecular weight of the resulting ethylene copolymer (a) can be regulated by allowing hydrogen to be present in the polymerization system or by changing the polymerization temperature. The molecular weight can be regulated also by changing the amount of the component (B).

In the preparation of the ethylene copolymer (a) using the transition metal imine catalyst and the metallocene catalyst, the copolymerization can be carried out as any of liquid phase polymerization, such as solution polymerization or suspension polymerization, and gas phase polymerization.

Examples of inert hydrocarbon media used in the liquid phase polymerization include the same inert hydrocarbon media as used in the preparation of the ethylene/α-olefin copolymer (b).

In the copolymerization of ethylene and an α-olefin of 3 to 20 carbon atoms using the transition metal imine catalyst and the metallocene catalyst, the component (A) is used in an amount of usually $10^{-12}$ to $10^{-2}$ mol, preferably $10^{-10}$ to $10^3$ mol, and the component (E) is used in an amount of usually $10^{-8}$ to $10^{31\ 3}$ mol, preferably $10^{-7}$ to $10^{-4}$ mol, based on 1 liter of the reaction volume. The component (A) is used in such an amount that the molar ratio ((A)/(E)) of the component (A) to the component (E) becomes usually 0.0001 to 200, preferably 0.001 to 100.

The component (B-1) is used in such an amount that the molar ratio ((B-1)/(M)) of the component (B-1) to the transition metal atom (M) in the component (A) and the component (E) becomes usually 0.01 to 100000, preferably 0.05 to 50000. The component (B-2) is used in such an amount that the molar ratio ((B-2)/(M)) of the aluminum atom in the component (B-2) to the transition metal atom (M) in the component (A) and the component (E) becomes usually 10 to 500000, preferably 20 to 100000. The component (B-3) is used in such an amount that the molar ratio ((B-3)/(M)) of the component (B-3) to the transition metal atom (M) in the component (A) and the component (E) becomes usually 1 to 20, preferably 1 to 10, more preferably 1 to 5.

In the polymerization, the components can be used in any way and in any order.

The temperature of the copolymerization using the transition metal imine catalyst and the metallocene catalyst is in the range of usually −50 to +200° C., preferably 0 to 170° C. The polymerization pressure is in the range of usually atmospheric pressure to 100 kg/cm$^2$, preferably atmospheric pressure to 50 kg/cm$^2$. The polymerization reaction can be carried out by any of batchwise, semi-continuous and continuous processes. It is possible to conduct the polymerization in two or more stages under different reaction conditions.

The molecular weight of the resulting ethylene copolymer (a) can be regulated by allowing hydrogen to be present in the polymerization system or by changing the polymerization temperature. The molecular weight can be regulated also by changing the type of the component (B).

Next, the propylene polymer composition according to the invention is described.

The propylene polymer composition of the invention comprises the ethylene copolymer (a) and polypropylene (d), and the weight ratio ((d)/(a)) of the polypropylene (d) to the ethylene copolymer (a) is in the range of 60/40 to 99/1, preferably 70/30 to 99/1, more preferably 70/30 to 95/5, still more preferably 70/30 to 90/10.

The polypropylene used as the polypropylene (d) may be homopolypropylene or a copolymer of propylene and ethylene, an α-olefin of 4 to 20 carbon atoms or the like. The copolymer may be a random copolymer or a block copolymer. The polypropylene may be isotactic polypropylene or syndiotactic polypropylene.

The polypropylene (d) desirably has a crystallinity of not less than 10%, preferably not less than 20%. The crystallinity can be measured by, for example, an X-ray diffraction method.

As a method of blending the polypropylene resin (d) and the ethylene copolymer (a) to prepare the propylene polymer composition, in-line blending in the preparation process or post blending is available.

More specifically, blending of the polypropylene resin (d) and the ethylene copolymer (a) can be carried out by, for example, the following methods.

(1) The polypropylene resin (d), the ethylene copolymer (a) and additives optionally used are mechanically blended using an extruder, a kneader or the like.

(2) The polypropylene resin (d), the ethylene copolymer (a) and additives optionally used are dissolved in an appropriate good solvent (e.g., hydrocarbon solvent such as hexane, heptane, decane, cyclohexane, benzene, toluene or xylene), and then the solvent is removed from the solution.

(3) The polypropylene resin (d), the ethylene copolymer (a) and additives optionally used are each independently dissolved in an appropriate good solvent, then the resulting solutions are mixed, and the solvents are removed from the mixture.

(4) The above methods (1) to (3) are carried out in combination.

The propylene polymer composition according to the invention is well-balanced between rigidity and impact strength.

Next, uses of the ethylene copolymer (a) and the propylene polymer composition according to the invention are described.

The ethylene copolymer (a) and the propylene polymer composition according to the invention are used for, for example, a foamed article and a film molded product.

The foamed article is obtained by expanding the ethylene copolymer (a) or the propylene polymer composition in an expansion ratio of 1.2 times to 50 times. The ethylene copolymer (a) or the composition containing the copolymer can be expanded in a high expansion ratio, and besides the resulting foamed article has high tear strength.

Examples of blowing agents used in the expansion molding include chemical blowing agents such as azo type blowing agents and gases such as carbon dioxide, water vapor and butene gas. If necessary, a blowing assistant can be used within limits not detrimental to the objects of the invention.

Examples of the expansion molding methods include a continuous extrusion expansion method in which the ethylene copolymer (a) or the propylene polymer composition and the blowing agent are kneaded and expanded at the same time by the use of an extruder, an expansion method in which the ethylene copolymer (a) or the propylene polymer composition and the blowing agent are kneaded and then expanded in a hot oven, and a mold expansion method using a press.

As for the foamed article of the invention, a closed-cell sponge or an open-cell sponge is produced according to the purpose. To the foamed article of the invention, a crosslinking agent or low-density polyethylene (LDPE) may be added within limits not detrimental to the objects of the invention.

The film molded product is obtained by film molding the ethylene copolymer (a) or the propylene polymer composition.

Examples of the film molding methods include an inflation molding method and a T-die molding method. The inflation molding method is preferable from the viewpoints of good balance between lengthwise and crosswise properties and low cost. Moreover, excellent bubble stability is exhibited when the inflation molding is carried out.

According to the present invention, a film of high impact strength can be obtained.

To the ethylene copolymer or the propylene polymer composition according to the invention, additives such as antioxidant, hydrochloric acid absorbent, heat stabilizer, light stabilizer, ultraviolet light absorber, lubricant, anti-static agent, flame retardant, pigment, dye, dispersant, copper harm inhibitor, neutralizing agent, blowing agent, plasticizer, anti-foaming agent, crosslinking agent, crosslinking assistant, crosslinking accelerator, flowability improver (e.g., peroxides), weld strength improver, processing aid, weathering stabilizer and anti-blooming agent, and if necessary, other polyolefin polymers such as homopolymers (e.g., polyethylene and polypropylene) and other α-olefin copolymers may be added within limits not detrimental to the objects of the invention. These optional additives and other polyolefin polymers may be used in combination of two or more kinds.

EFFECT OF THE INVENTION

The ethylene copolymer (a) of the invention and the composition containing the copolymer (a) contain small quantities of long-chain branches and have high viscosity in the low shear rate region. Therefore, when the copolymer or the composition is molded into a foamed article applicable to sponge use, a high expansion ratio can be achieved, and besides a sponge of high tear strength can be obtained. When the copolymer or the composition is molded into a film molded product applicable to film use, excellent moldability is exhibited, and besides a film of high impact strength can be obtained. When the copolymer or the composition is used as a modifier of a resin such as polypropylene, a resin composition well-balanced between rigidity and impact strength can be obtained.

EXAMPLE

The present invention is further described with reference to the following examples, but it should be construed that the invention is in no way limited to those examples.

In the following examples, the intrinsic viscosity (η) was measured in decalin at 135° C. The molecular weight distribution (Mw/Mn) was determined by measuring Mw and Mn through gel permeation chromatography (GPC) at 140° C. using o-dichlorobenzene as a solvent.

The melt viscosity was measured by means of RDS-II manufactured by Rheometrics Co. A disc having a diameter of 25 mm punched from a sheet having a thickness of 2 mm was used as a sample.

The activation energy of a shift factor was determined by measuring frequency dependence of storage elastic modulus (G') at 150° C., 170° C., 190° C., 210° C. and 230° C. and shifting the obtained data.

Specifically, the activation energy (Ea) of a shift factor was measured in the following manner.

Using a rheometer RDS-II manufactured by Rheometrics Co., variance of angular velocity (ω (rad/sec)) of the storage elastic modulus (G' (dyne/cm$^2$)) was measured. A parallel plate having a diameter of 25 mm was used as a sample holder, and the sample was made to have a thickness of about 2 mm. The measuring temperatures were 150° C., 170° C., 190° C., 210° C. and 230° C., and G' was measured at each temperature under the condition of $0.04 \leq \omega \leq 400$. The strain was appropriately selected from the range of 2 to 25% so that the torque in the measuring range could be detected and no torque-over would take place. After the measurement, flow curves given under five temperature conditions were overlapped, taking 190° C. as the reference temperature, and from the Arrhenius type plot of a shift factor, Ea was determined. Calculation was made using an analytical soft wear RHIOS that is an accessory of RDS-II.

Polymerization Example 1

In a 2-liter stainless steel autoclave thoroughly purged with nitrogen, 850 ml of heptane was placed at room temperature, and the temperature was raised to 60° C. Subsequently, with keeping the temperature at 60° C., propylene was fed until the pressure became 6.0 kg/cm$^2$-G, and the autoclave was further pressurized with ethylene until the total pressure became 8 kg/cm$^2$-G. Thereafter, 0.2 mmol of triisobutylaluminum and a solution containing 0.05 mmol of triisobutylaluminum, 0.0025 mmol of a compound 1 of the following formula and 0.005 mmol of triphenylcarbeniumtetrakis(pentafluorophenyl)borate, said solution having been previously mixed, were added to initiate polymerization with keeping the temperature at 60° C. After 5 minutes, methanol was added to terminate the polymerization. The resulting polymer solution was mixed with 2 liters of acetone to precipitate a polymer. The polymer was separated from the solvent and then vacuum dried at 130° C. for 10 hours.

Thus, an ethylene/propylene copolymer was obtained in an amount of 4.24 g. The ethylene/propylene copolymer has an ethylene unit content of 79.1% by mol, an intrinsic viscosity of 14.5 dl/g and Mw/Mn of 2.4.

The results are set forth in Table 1.

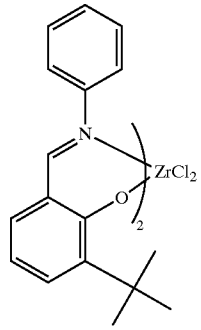

Polymerization Example 2

In a 2-liter stainless steel autoclave thoroughly purged with nitrogen, 600 ml of heptane and 400 ml of 1-butene were placed at room temperature, and the temperature was raised to 60° C. Subsequently, the autoclave was pressurized with ethylene until the total pressure became 8 kg/cm$^2$-G. Thereafter, 0.2 mmol of triisobutylaluminum and a solution containing 0.05 mmol of triisobutylaluminum, 0.0025 mmol of a compound 1 of the above formula and 0.005 mmol of triphenylcarbeniumtetrakis(pentafluorophenyl)-borate, said solution having been previously mixed, were added to initiate polymerization with keeping the temperature at 60° C. After 5 minutes, methanol was added to terminate the polymerization. The resulting polymer solution was mixed with 2 liters of acetone to precipitate a polymer. The polymer was separated from the solvent and then vacuum dried at 130° C. for 10 hours.

Thus, an ethylene/1-butene copolymer was obtained in an amount of 4.89 g. The ethylene/1-butene copolymer had an ethylene unit content of 89.1% by mol, an intrinsic viscosity of 14.2 dl/g and Mw/Mn of 2.4.

The results are set forth in Table 1.

TABLE 1

|  | Polymerization Example 1 | Polymerization Example 2 |
| --- | --- | --- |
| Copolymer No. | 1 | 2 |
| Type of comonomer | Propylene | 1-Butene |
| Polymer properties |  |  |
| Ethylene content (mol %) | 79.1 | 89.1 |
| Mw/Mn | 2.4 | 2.4 |
| Intrinsic viscosity (dl/g) | 14.5 | 14.2 |

Polymerization Example 3

In a 2-liter continuous polymerization reactor equipped with a stirring blade, said reactor having been thoroughly purged with nitrogen, 1 liter of dehydrated and purified hexane was placed. To the reactor, a hexane solution of ethylaluminum sesquichloride (Al(C$_2$H$_5$)$_{1.5}$·Cl$_{1.5}$) adjusted to have a concentration of 8.0 mmol/l was continuously fed for 1 hour at a rate of 500 ml/hr. Then, to the reactor were further fed a hexane solution of VO(OC$_2$H$_5$)Cl$_2$ adjusted to have a concentration of 0.8 mmol/l at a rate of 500 ml/hr and hexane at a rate of 500 ml/hr. On the other hand, the polymer solution was continuously drawn out from the top of the polymerization reactor so that the amount of the polymer solution in the reactor would be invariably 1 liter. Then, to the reactor were fed ethylene at a rate of 240 l/hr, propylene at a rate of 60 l/hr and hydrogen at a rate of 5 l/hr using a bubbling tube. The copolymerization reaction was carried out at 35° C. by circulating a cooling medium through a jacket equipped outside the polymerization reactor. Through the reaction under the above conditions, a polymer solution containing an ethylene/propylene copolymer was obtained. The polymer solution was deashed by the use of hydrochloric acid, then introduced into a large amount of methanol to precipitate an ethylene/propylene copolymer and vacuum dried at 130° C. for 24 hours. Properties of the resulting polymer are set forth in Table 2.

Polymerization Examples 4–6

The procedure of Polymerization Example 3 was repeated except that the feed rates of ethylene, propylene and hydrogen and the type of comonomer were changed as shown in Table 2. Properties of the resulting polymers are set forth in Table 2.

TABLE 2

|  | Polymerization Ex. 3 | Polymerization Ex. 4 | Polymerization Ex. 5 | Polymerization Ex. 6 |
|---|---|---|---|---|
| Copolymer No. | 3 | 4 | 5 | 6 |
| Type of comonomer | Propylene | Propylene | 1-Butene | 1-butene |
| Rate of feed gas |  |  |  |  |
| Ethylene (l/hr) | 240 | 240 | 240 | 240 |
| Propylene (l/hr) | 60 | 60 | — | — |
| 1-Butene (l/hr) | — | — | 70 | 70 |
| Hydrogen (l/hr) | 5 | 7 | 3 | 4 |
| Polymer properties |  |  |  |  |
| Ethylene content (mol %) | 82.1 | 82.3 | 89.8 | 89.7 |
| Mw/Mn | 2.0 | 2.0 | 2.1 | 2.1 |
| (η) (dl/g) | 2.1 | 1.6 | 2.2 | 1.6 |

EXAMPLE 1

In 5 liters of heptane heated to 80° C., 0.5 g of the ethylene/propylene copolymer 1 obtained in Polymerization Example 1 and 4.5 g of the ethylene/propylene copolymer 4 obtained in Polymerization Example 4 were dissolved, and the solution was homogeneously stirred. Then, the solvent was distilled off by the use of an evaporator. The resulting composition was pressed molded at 190° C. to prepare a sheet of 2 mm, and the sheet was subjected to various measurements. The results are set forth in Table 3.

EXAMPLE 2

In 5 liters of heptane heated to 80° C., 0.5 g of the ethylene/1-butene copolymer 2 obtained in Polymerization Example 2 and 4.5 g of the ethylene/1-butene copolymer 6 obtained in Polymerization Example 6 were dissolved, and the solution was homogeneously stirred. Then, the solvent was distilled off by the use of an evaporator. The resulting composition was press molded at 190° C. to prepare a sheet of 2 mm, and the sheet was subjected to various measurements. The results are set forth in Table 3.

Comparative Examples 1 and 2

Evaluation was carried out using the copolymers 3 and 5 obtained in Polymerization Examples 3 and 5. The results are set forth in Table 3.

TABLE 3

|  | Ex. 1 | Comp. Ex. 1 | Ex. 2 | Comp. Ex. 2 |
|---|---|---|---|---|
| Composition | 1/4 | 3 | 2/6 | 5 |
| Weight ratio | 10/90 | 100 | 10/90 | 100 |
| Polymer properties |  |  |  |  |
| Mz/Mw | 20.5 | 1.8 | 19.7 | 1.9 |
| Mw/Mn | 3.8 | 2.0 | 3.5 | 2.1 |
| (η) (dl/g) | 2.1 | 2.1 | 2.2 | 2.2 |
| $\eta^*_{0.01}/\eta^*_8$ | 9.1 | 1.7 | 8.7 | 1.9 |
| $0.843 \times (\eta) + 1.0$ | 2.8 | 2.8 | 2.9 | 2.9 |
| Ea × 10$^4$ (J/mol · K) | 3.1 | 3.1 | 3.2 | 3.2 |
| Tm (° C.) | 46 | 47 | 66 | 67 |

What is claimed is:

1. An ethylene copolymer (a) obtained from ethylene and an α-olefin of 3 to 20 carbon atoms and satisfying the following requirements (i) to (v):
   (i) said copolymer comprises 40 to 99% by mol of recurring units derived from ethylene and 1 to 60% by mol of recurring units derived from an α-olefin of 3 to 20 carbon atoms,
   (ii) the ratio (Mz/Mw) of a Z average molecular weight (Mz) to a weight-average molecular weight (Mw), each molecular weight being measured by gel permeation chromatography, is in the range of 10 to 30, and said ratio (Mz/Mw) and the ratio (Mw/Mn) of a weight-average molecular weight (Mw) to a number-average molecular weight (Mn), each molecular weight being measured by gel permeation chromatography, satisfy the following relation $$(Mz/Mw) > (Mw/Mn),$$

(iii) the intrinsic viscosity, as measured in decalin at 135° C., is in the range of 0.5 to 4 dl/g,
   (iv) the ratio ($\eta^*_{0.01}/\eta^*_8$) of a melt viscosity ($\eta^*_{0.01}$) at a shear rate of 0.01 rad/sec, as measured at 190° C., to a melt viscosity ($\eta^*_8$) at a shear rate of 8 rad/sec, as measured at 190° C., and the intrinsic viscosity (η) satisfy the following relation (1)

$$(\eta^*_{0.01}/\eta^*_8) \geq 0.843 \times (\eta) + 1.0 \qquad (1),$$

and
   (v) the absolute value of an activation energy ($E_a$) of a shift factor of melt viscoelasticity is not more than 4×10$^4$ J/mol·K.

2. The ethylene copolymer (a) as claimed in claim 1, comprising:
   an ethylene/α-olefin copolymer (b) which comprises 40 to 99% by mol of recurring units derived from ethylene and 1 to 60% by mol of recurring units derived from an α-olefin of 3 to 20 carbon atoms and has a value of Mw/Mn, as measured by gel permeation chromatography, of 1.8 to 3.0 and an intrinsic viscosity of not less than 10 dl/g, and
   an ethylene/α-olefin copolymer (c) which comprises 40 to 99% by mol of recurring units derived from ethylene and 1 to 60% by mol of recurring units derived from an α-olefin of 3 to 20 carbon atoms and has a value of Mw/Mn, as measured by gel permeation chromatography, of 1.5 to 3.0 and an intrinsic viscosity of 0.3 to 3 dl/g;
   wherein the weight ratio ((b)/(c)) of the ethylene/α-olefin copolymer (b) to the ethylene/α-olefin copolymer (c) is in the range of 0.1/99.9 to 30/70.

3. The ethylene copolymer (a) as claimed in claim 2, wherein the ethylene/α-olefin copolymer (b) is obtained by copolymerizing ethylene and an α-olefin of 3 to 20 carbon atoms in the presence of a transition metal imine catalyst comprising:
(A) a transition metal imine compound represented by the following formula (I), and
(B) at least one compound selected from the group consisting of:
(B-1) an organometallic compound,
(B-2) an organoaluminum oxy-compound, and
(B-3) a compound which reacts with the transition metal imine compound (A) to form an ion pair;

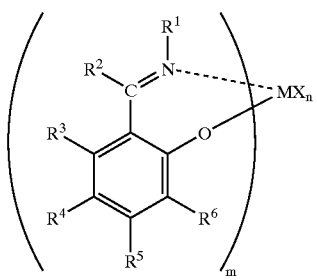

wherein M is a transition metal atom of Group 3 to Group 10 of the periodic table, m is an integer of 1 to 6, $R^1$ to $R^6$ may be the same or different, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, two or more of them may be bonded to each other to form a ring, and when m is 2 or greater, one group of $R^1$ to $R^6$ contained in one ligand and one group of $R^1$ to $R^6$ contained in another ligand may be bonded to each other, and $R^1$s, $R^2$s, $R^3$s, $R^4$s, $R^5$s or $R^6$s among the ligands may be the same or different, n is a number satisfying a valence of M, X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

4. A resin modifier comprising the ethylene copolymer (a) as claimed in any one of claims 1 to 3.

5. A foamed article obtained by expanding the ethylene copolymer (a) as claimed in any one of claims 1 to 3 in an expansion ratio of 1.2 to 50 times.

6. A film molded product obtained by molding the ethylene copolymer (a) as claimed in any one of claims 1 to 3.

7. A process for preparing an ethylene copolymer, comprising copolymerizing ethylene and an α-olefin of 3 to 20 carbon atoms in the presence of the following catalyst (1) and the following catalyst (2) or (3) to obtain the ethylene copolymer (a) as claimed in claim 1:

(1) a transition metal imine catalyst comprising:
(A) the transition metal imine compound represented by the formula (I) described in claim 3, and
(B) at least one compound selected from the group consisting of:
(B-1) an organometallic compound,
(B-2) an organoaluminum oxy-compound, and
(B-3) a compound which reacts with the transition metal imine compound (A) to form an ion pair;

(2) a vanadium catalyst comprising:
(C) a vanadium compound represented by the following formula (II):

$$VO(OR)_nX_{3-n} \qquad (II)$$

wherein R is a straight-chain or branched alkyl group, X is a halogen, and $0 \leq n \leq 3$), and
(D) an organoaluminum compound;

(3) a metallocene catalyst comprising:
(E) a metallocene compound of a metal of Group 4 of the periodic table, which contains a ligand having cyclopentadienyl skeleton, and
(B) at least one compound selected from the group consisting of:
(B-1) an organometallic compound,
(B-2) an organoaluminum oxy-compound, and
(B-3) a compound which reacts with the metallocene compound (E) to form an ion pair.

8. A propylene polymer composition comprising the ethylene copolymer (a) as claimed in any one of claims 1 to 3 and polypropylene (d), wherein the weight ratio ((d)/(a)) of the polypropylene (d) to the ethylene copolymer (a) is in the range of 60/40 to 99/1.

9. A foamed article obtained by expanding the propylene polymer composition as claimed in claim 8 in an expansion ratio of 1.2 to 50 times.

10. A film molded product obtained by molding the propylene copolymer composition as claimed in claim 8.

* * * * *